(12) United States Patent
Sarwat et al.

(10) Patent No.: US 12,451,735 B1
(45) Date of Patent: Oct. 21, 2025

(54) SYSTEMS AND METHODS FOR STABILIZING POWER AND VOLTAGE IN DYNAMIC WIRELESS CHARGING

(71) Applicants: Arif I. Sarwat, Miami, FL (US); Milad Behnamfar, Miami, FL (US)

(72) Inventors: Arif I. Sarwat, Miami, FL (US); Milad Behnamfar, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/188,472

(22) Filed: Apr. 24, 2025

(51) Int. Cl.
*H02J 7/00* (2006.01)
*B60L 53/122* (2019.01)
*B60L 53/60* (2019.01)
*H02J 50/12* (2016.01)
*H02J 50/70* (2016.01)
*H02J 50/40* (2016.01)
*H02M 3/156* (2006.01)

(52) U.S. Cl.
CPC ............ *H02J 50/70* (2016.02); *B60L 53/122* (2019.02); *B60L 53/60* (2019.02); *H02J 50/12* (2016.02); *B60L 2210/12* (2013.01); *H02J 50/40* (2016.02); *H02M 3/156* (2013.01)

(58) Field of Classification Search
USPC ....................................................... 320/108
See application file for complete search history.

(56) References Cited

U.S. PATENT DOCUMENTS 11,031,826 B2 * 6/2021 Boys ..................... H02J 50/402
2017/0104373 A1 * 4/2017 Bae ......................... H02M 7/06

OTHER PUBLICATIONS

CN-111555470-A, Machine Translation (Year: 2020).*
CN-110994985-A—Machine Translation (Year: 2020).*

* cited by examiner

*Primary Examiner* — Samuel Berhanu
(74) *Attorney, Agent, or Firm* — SALIWANCHIK, LLOYD & EISENSCHENK

(57) ABSTRACT

Systems and methods are provided for stabilizing power and voltage in dynamic wireless charging (e.g., of electric vehicles). Systems and methods can use a composite control that combines a backstepping control approach with passivity-based control to stabilize output voltage during movement of the load (e.g., travel of the electric vehicle) and/or changing load conditions. As an example, a Lyapunov function-based control method can be used to regulate output voltage and power by controlling a boost converter at the secondary side. Systems and methods can ensure that the output voltage remains independent of load conditions, while also effectively maintaining smooth power delivery even as the load and mutual coupling fluctuate simultaneously, demonstrating rapid response to varying load conditions and mutual coupling.

18 Claims, 32 Drawing Sheets

CIRCUIT PARAMETERS AND SPECIFICATION

| Parameter | Description | value |
|---|---|---|
| $V_{in}$ | Input voltage | 200 V |
| $L_{p1}, L_{p2}, L_{p3}$ | Self-inductance of transmitter coils | 50 $\mu H$ |
| $C_{p1}, C_{p2}, C_{p3}$ | Primary series resonant capacitors | 70 nF |
| $L_2$ | Self-inductance of receiver coil | 50 $\mu H$ |
| $C_s$ | Secondary resonant capacitor | 70 nH |
| $C_{b1}$ | Input capacitor of buck converter | 100 $\mu F$ |
| $C_{b2}$ | Output capacitor of buck converter | 75 $\mu F$ |
| $L_d$ | Inductor of buck converter | 9 mH |
| $f_s$ | Operating frequency of inverter | 85 kHz |
| $f$ | Frequency of buck converter | 20 kHz |
| $R_L$ | Load resistor | 22 $\Omega$ |
| $P_{ref}$ | Reference value for output power | 6000 W |

FIG. 16

TRANSMITTER AND RECEIVER COUPLER DIMENSIONS

| Parameter | Description | value |
|---|---|---|
| $l_{AL}$ | Aluminium plate length | 410mm |
| $w_{AL}$ | Aluminium plate width | 410mm |
| $l_{fe}$ | Ferrite plate length | 370mm |
| $w_{fe}$ | Ferrite plate width | 370mm |
| $w_c$ | Coil's width | 25mm |
| $l_{in,coil}$ | Inner length of coil | 230mm |
| $l_{overlap}$ | Overlapping length of coils | 185mm |
| $d_{coil}$ | Distance between adjacent transmitter coils | 50mm |
| $d$ | airgap | 150mm |

FIG. 17

| COMPARISON WITH DIFFERENT SECONDARY SIDE CONTROL SCHEMES | | | | | |
|---|---|---|---|---|---|
| | This work | [16] | [18] | [17] | [25] |
| Receiver's Controlled component | Buck converter | Buck converter | Buck converter | Three-level buck converter | Buck converter |
| Control scheme | SOSM+Back stepping | PIPBC | MPC | Frequency domain composite | Internal model-based+DOB |
| Control objective | Output power | Received dc voltage | Received dc voltage | Output voltage | Output voltage |
| Number of sensors | One voltage sensor and one current sensor | Two voltage sensors and one current sensor | Two voltage sensors and one current sensor | Three voltage sensors and two current sensors | One voltage sensor |
| Output power fluctuation | [415W,415.2W], fluctuation rate 0.1% | [500W,2630W] | [100W,2250W] | Not mentioned | [131.1W,121.35W], fluctuation rate 0.2% |
| Efficiency | 84% | [58%,91.06%] | [15%,90%] | 87% | 76.28% |

FIG. 18

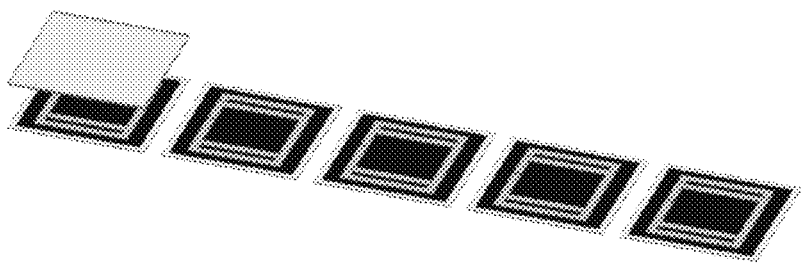

FIG. 19

| Parameter | Description | value |
| --- | --- | --- |
| $V_{in}$ | Input voltage | 200 V |
| $L_{p1}, L_{p2}, L_{p3}$ | Self-inductance of transmitter coils | $420\mu H$ |
| $L_{fp1}, L_{fp2}, L_{fp3}$ | Primary compensation inductor | $45\mu H$ |
| $C_{fp1}, C_{fp2}, C_{fp3}$ | Primary parallel compensation capacitors | $78.47nF$ |
| $C_{p1}, C_{p2}, C_{p3}$ | Primary series compensation capacitors | $9.46nF$ |
| $L_2$ | Self-inductance of receiver coil | $420\mu H$ |
| $L_{f2}$ | Secondary compensation inductor | $45\mu H$ |
| $C_{f2}$ | Secondary parallel compensation capacitor | $78.47nF$ |
| $C_2$ | Secondary series compensation capacitor | $9.46nF$ |
| $C_{b1}$ | Input capacitor of boost converter | $100\mu F$ |
| $C_{b2}$ | Output capacitor of boost converter | $15\mu F$ |
| $L_d$ | Inductor of boost converter | $9mH$ |
| $f_s$ | Operating frequency of inverter | $85kHz$ |
| $f$ | Frequency of boost converter | $20kHz$ |
| $R_L$ | Load resistor | $22\Omega$ |
| $V_{ref}$ | Reference value for output voltage | $200V$ |

FIG. 28

CIRCUIT PARAMETERS

| Parameter | Description | value |
|---|---|---|
| $V_{in}$ | Input voltage | $400V$ |
| $L_{p1}, L_{p2}, L_{p3}$ | Self-inductance of transmitter coils | $50\mu H$ |
| $C_{p1}, C_{p2}, C_{p3}$ | Primary series resonant capacitors | $70nF$ |
| $L_2$ | Self-inductance of receiver coil | $50\mu H$ |
| $C_s$ | Secondary resonant capacitor | $70nF$ |
| $C_{b1}$ | Input capacitor of buck converter | $100\mu F$ |
| $C_{b2}$ | Output capacitor of buck converter | $75\mu F$ |
| $L_d$ | Inductor of buck converter | $9mH$ |
| $f_s$ | Operating frequency of inverter | $85kHz$ |
| $f$ | Frequency of buck converter | $20kHz$ |
| $R_L$ | Load resistor | $22\Omega$ |
| $V_{ref}$ | Reference value for output voltage | $200V$ |

FIG. 29

SYSTEMS AND METHODS FOR STABILIZING POWER AND VOLTAGE IN DYNAMIC WIRELESS CHARGING

BACKGROUND

Dynamic wireless charging (DWC) systems offer continuous charging for mobile electric vehicles, eliminating range anxiety of users and reducing the need for a high battery capacity. However, power pulsation due to the movement of the electric vehicle affects the efficiency and the battery lifetime adversely.

BRIEF SUMMARY

Embodiments of the subject invention provide novel and advantageous systems and methods for stabilizing power and voltage in dynamic wireless charging (DWC) (e.g., DWC of electric vehicles). Systems and methods can use a composite control that combines a backstepping control approach with passivity-based control to stabilize output voltage during movement of the load (e.g., travel of the electric vehicle) and/or changing load conditions. As an example, a Lyapunov function-based control method can be used to regulate output voltage and power by controlling a boost converter at the secondary side. Systems and methods can ensure that the output voltage remains independent of load conditions, while also effectively maintaining smooth power delivery even as the load and mutual coupling fluctuate simultaneously, demonstrating rapid response to varying load conditions and mutual coupling.

In an embodiment, a system for stabilizing voltage (and/or power) in DWC can comprise: a receiver coil configured to perform DWC with at least one transmitter coil; a direct current (DC)-DC converter (e.g., a DC-DC buck converter) in operable communication with the receiver coil; and a controller in operable communication with the DC-DC converter (at the receiver side). The controller can be configured to perform the following steps during DWC: i) receive, from the receiver side during DWC, an output voltage of the DC-DC converter; ii) perform a backstepping control to determine/compute a reference inductor current of the DC-DC converter based on an error of the output voltage of the DC-DC converter; and iii) perform a passivity-based control to drive an inductor current of the DC-DC converter to the reference inductor current (as determined/computed by the backstepping control), thereby stabilizing an output voltage (and/or an output power) of a DWC apparatus performing the DWC. The performing of steps ii) and/or iii) can comprise using a Lyapunov function to regulate the output voltage of the DWC apparatus. The performing of the passivity-based control can comprise employing a dual-phase approach to reduce energy oscillations in inductors and capacitors of the receiver coil. The dual-phase approach can comprise use of damping gains. The system can have an efficiency (e.g., actual output voltage (or power) divided by maximum possible output voltage (or power) based on input to and/or from transmitter coil(s)) of, for example, at least 80% (e.g., 84%, about 84%, or at least 84%) as the receiver coil moves (e.g., with a speed of, for example, 50 kilometers per hour (km/h)) with respect to the at least one transmitter coil. The system can be configured such that the output voltage has a fluctuation of, for example, less than 2% (e.g., less than 1%) as the receiver coil moves (e.g., with a speed of, for example, 50 km/h) with respect to the at least one transmitter coil. The system can further comprise an electric vehicle, and the receiver coil can be disposed on the electric vehicle. The system can further comprise the at least one transmitter coil. The receiver coil can be a bipolar coil, and/or each transmitter coil of the at least one transmitter coil can be a bipolar coil. The system can exclude a detection mechanism/system entirely, such that the system includes no detection mechanism/system in operable communication with any of the receiver coil, the DC-DC converter, the at least one transmitter coil, and the controller.

In another embodiment, a method for stabilizing voltage (and/or power) in DWC can comprise: i) receiving (e.g., by a controller), from a receiver side during DWC, an output voltage of a DC-DC converter (e.g., a DC-DC buck converter) in operable communication with a receiver coil on the receiver side (e.g., based on output from at least one transmitter coil); ii) performing (e.g., by the controller in operable communication with the DC-DC converter) a backstepping control on to determine/compute a reference inductor current of the DC-DC converter based on an error of the output voltage of the DC-DC converter; and iii) performing (e.g., by the controller) a passivity-based control to drive an inductor current of the DC-DC converter to the reference inductor current (as determined/computed by the backstepping control), thereby stabilizing an output voltage (and/or an output power) of a DWC apparatus performing the DWC. The performing of steps ii) and/or iii) can comprise using a Lyapunov function to regulate the output voltage of the DWC apparatus. The performing of the passivity-based control can comprise employing a dual-phase approach to reduce energy oscillations in inductors and capacitors of the receiver coil. The dual-phase approach can comprise use of damping gains. The method can have an efficiency (e.g., actual output voltage (or power) divided by maximum possible output voltage (or power) based on input to and/or from transmitter coil(s)) of, for example, at least 80% (e.g., 84%, about 84%, or at least 84%) as the receiver coil moves (e.g., with a speed of, for example, 50 km/h) with respect to the at least one transmitter coil. The output voltage can have a fluctuation of, for example, less than 2% (e.g., less than 1%) as the receiver coil moves (e.g., with a speed of, for example, 50 km/h) with respect to the at least one transmitter coil. The receiver coil can be disposed on an electric vehicle. The receiver coil can be a bipolar coil, and/or each transmitter coil of the at least one transmitter coil can be a bipolar coil. The method can be performed excluding the use of any detection mechanism/system, such that no detection mechanism/system is in operable communication with any of the receiver coil, the DC-DC converter, the at least one transmitter coil, and the controller.

BRIEF DESCRIPTION OF DRAWINGS

FIG. 16 shows a table of circuit parameters and specifications.

FIG. 17 shows a table of transmitter and receiver coupler dimensions (e.g., for the coupler structure shown in FIG. 19).

FIG. 18 shows a table of a comparison with different secondary side control schemes. The column labeled "This work" is for embodiments of the subject invention. The columns labeled "[16]", "[18]", "[17]", and "[25]" are respectively for secondary side control schemes from Liu et al. (Passivity-based pi control for receiver side of dynamic wireless charging system in electric vehicles, IEEE Transactions on Industrial Electronics, vol. 69, no. 1, pp. 783-794, 2021), Zhou et al. (Model predictive control for the receiving-side dc-dc converter of dynamic wireless power transfer, IEEE Transactions on Power Electronics, vol. 35, no. 9, pp. 8985-8997, 2020), Zhang et al. (Composite control to suppress output fluctuation for receiver side of dynamic wireless power transfer system, IEEE Transactions on Power Electronics, vol. 38, no. 5, pp. 6720-6733, 2023), and Su et al. (Precise disturbance rejection for dynamic wireless charging system of electric vehicle using internal model-based regulator with disturbance observer, IEEE Transactions on Industrial Electronics, pp. 1-11, 2023). All four of the references mentioned in the previous sentence are hereby incorporated by reference herein in their entireties.

FIG. 19 shows a three-dimensional (3D) view of a coupler structure. FIG. 19 shows an inductive coupler employing bipolar coils on both the transmitter and receiver sides.

FIG. 28 shows a table of circuit parameters and specifications.

FIG. 29 shows a table of circuit parameters and specifications.

DETAILED DESCRIPTION

Figure 1:
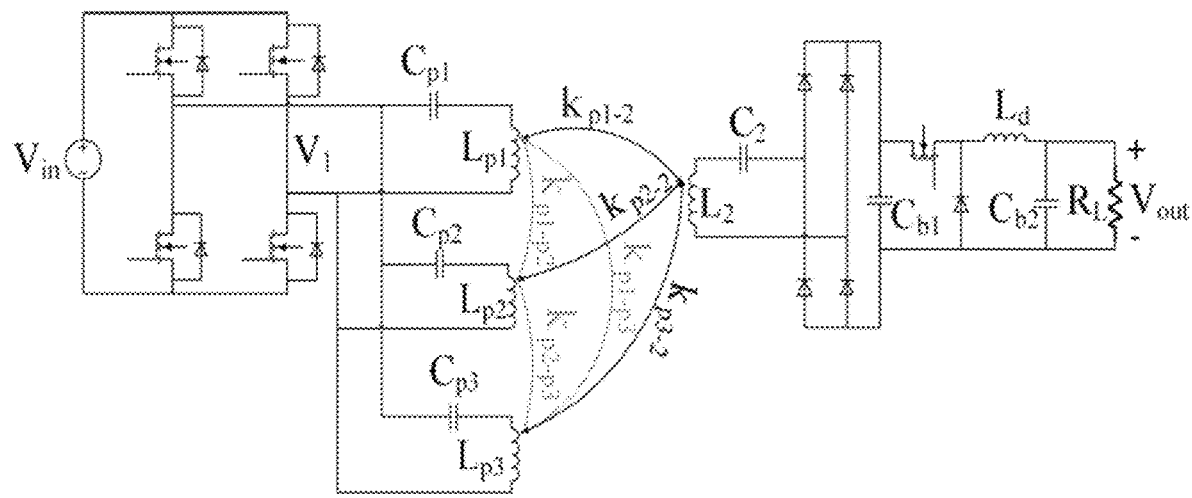
FIG. 1 shows the circuit topology of a dynamic wireless charging (DWC) system. The system includes a direct current (DC)-DC buck converter added on the vehicle side of the system.

Embodiments of the subject invention provide novel and advantageous systems and methods for stabilizing power and voltage in dynamic wireless charging (DWC) (e.g., DWC of electric vehicles). Systems and methods can use a composite control that combines a backstepping control approach with passivity-based control to stabilize output voltage during movement of the load (e.g., travel of the electric vehicle) and/or changing load conditions. As an example, a Lyapunov function-based control method can be used to regulate output voltage and power by controlling a boost converter at the secondary side. Systems and methods can ensure that the output voltage remains independent of load conditions, while also effectively maintaining smooth power delivery even as the load and mutual coupling fluctuate simultaneously, demonstrating rapid response to varying load conditions and mutual coupling.

DWC is an emerging technology designed to alleviate range anxiety by enabling continuous charging for electric vehicles in motion. As an electric vehicle travels over transmitter coils, fluctuations in mutual coupling can lead to variations in output voltage and power, potentially reducing battery lifespan and causing efficiency fluctuations. In response to these challenges, embodiments of the subject invention provide systems and methods for controlling during DWC by combining the backstepping control approach with passivity-based control to stabilize output voltage during vehicle travel and changing load conditions. Simulation results validate its effectiveness in suppressing output voltage fluctuations while the vehicle is in motion, limiting the fluctuation rate to below 2%.

Wireless power transfer technology for charging electric vehicles is a solution to overcome the limitations of plug-in charging, offering both convenience and efficiency while effectively addressing issues associated with plug-in charging. Wireless charging systems for electric vehicles are categorized into two primary types, stationary charging and DWC. DWC ensures uninterrupted and continuous charging for moving vehicles, thereby reducing battery size and cost, addressing the range limitations of electric vehicles and enhancing safety during the charging process. Two main types of DWC exist, based on the configuration of the transmitter coil: the long-track transmitter; and the segmented coil array. The long-track transmitter utilizes an elongated track significantly larger than the receiver coils, enabling simultaneous long-distance charging of multiple vehicles. However, this type of DWC system is hindered by issues of low efficiency and high electromagnetic interference. In contrast, the segmented coil array type effectively addresses the shortcomings of the long-track type but introduces mutual coupling variations as vehicles move across multiple transmitter coils. These mutual coupling variations can lead to output voltage fluctuations due to vehicle movement. Addressing voltage fluctuation is critical in DWC systems due to its potential impact on battery longevity and overall system efficiency. Moreover, significant fluctuations in output voltage not only complicate the design of the receiver's direct current (DC)-DC converter but also reduce the system's average output power. Therefore, improving output stability is paramount in DWC technology. Approach to attempt to mitigate output voltage fluctuations in DWC systems include advancements in magnetic coil structures, optimization of compensation networks, and implementation of control strategies aimed at stabilizing output voltage.

Developing coupler structures is an effective approach to minimizing output voltage fluctuations by achieving a smoother mutual coupling profile. These developments include optimizing the dimensions of transmitters and receivers, adjusting coil arrangements, employing multiphase transmitters or receivers, integrating additional coils into transmitters, utilizing solenoid coil structure, and implementing segmented transmitters with alternating unipolar and bipolar coils. Another aspect in mitigating voltage fluctuations is the optimization of compensation networks.

Control strategies provide an effective approach to maintaining a consistent output voltage profile, particularly in DWC systems. Control schemes aimed at mitigating output voltage fluctuations can be categorized into primary side control, secondary side control, and dual side control. Primary side control, though straightforward, faces limitations in regulating electric vehicle batteries and relies on wireless communication between primary and secondary sides. Nonlinear controllers are preferred for DWC systems due to their robust response to disturbances.

Related art control strategies fail to reduce the output voltage fluctuation rate to under 2% (or even close thereto). Embodiments of the subject invention provide a composite control scheme that integrates backstepping control and passivity-based control, effectively mitigating output voltage fluctuation and maintaining it below 2% (e.g., 1% or less) while the receiver is in motion under varying operating conditions, including load changes and voltage reference transitions. The effectiveness of this composite control strategy has been validated under different operating conditions, demonstrating superior performance in mitigating output voltage fluctuations even when the receiver is in motion.

FIG. 1 shows the circuit topology of a DWC system, with a DC-DC buck converter added on the vehicle side of the system. As shown in FIG. 1, $k_{pj\text{-}2}$ denotes the mutual inductance between the jth transmitter coil $L_{pj}$ and the receiver coil $L_2$. Additionally, $k_{p1\text{-}p2}$ and $k_{p2\text{-}p3}$ represent the mutual inductance between neighboring transmitter coils. The series-series compensation network can be utilized for the DWC system due to its simplicity, with $C_{p1}$, $C_{p2}$, and $C_{p3}$ serving as the primary series compensation network for each transmitter coil, and $C_2$ acting as the secondary series compensation network.

Figure 2A:
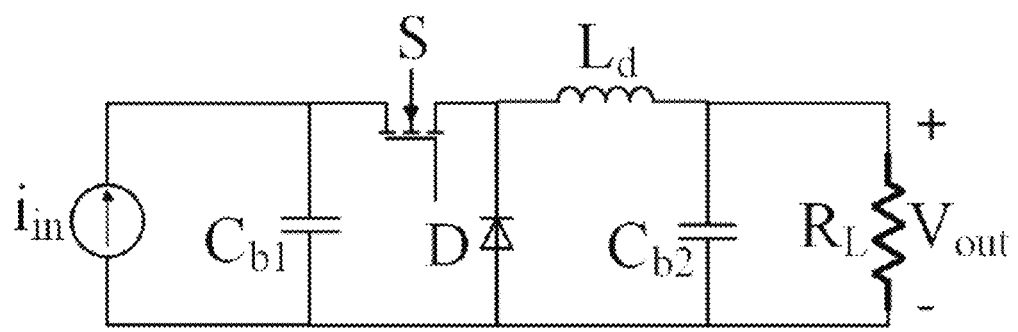
FIG. 2A shows the simplified circuit topology of a buck converter at the vehicle side of a DWC system.

As the double-sided series compensation network has a current source characteristic, the inductive power transfer (IPT) system, which is the input of the DC-DC buck converter, can be modeled as an ideal current source, represented by $i_{in}$ as shown in FIG. 2A.

The $i_{in}$ can be expressed as follows:

$$i_{in}(t) = \frac{\pi V_{in}}{2\omega \sum_{i=1}^{3} M_{pi,2}} |\sin(\omega t)| \qquad (1)$$

The equations for average state model of the buck converter are as follows:

$$L_d \frac{di_{L_d}}{dt} = \mu V_{C_{b1}} - V_{out} \qquad (2)$$

$$C_{b1} \frac{dVC_{b1}}{dt} = i_{in} - \mu i_{L_d}$$

$$C_{b2} \frac{dV_{out}}{dt} = i_{L_d} - \frac{V_{out}}{R_L}$$

where $C_{b1}$, $C_{b2}$ and $L_d$ are the input capacitor, output capacitor and the inductor of the buck converter, respectively. $V_{C_{b1}}$, $V_{out}$, $i_{L_d}$, and $\mu$ represent the voltage of input capacitor, output capacitor voltage, the inductor current, and the duty cycle, respectively. As an important goal is to achieve the desired output voltage at the output of the DC-DC buck converter, it is important to determine the switching control strategy based on considerations of robustness and stability. Note that $V_{out}$ can also be referred to as $V_{Cb2}$.

First, the design of the composite control strategy can begin with the development of the backstepping controller. The error in tracking voltage, defined as the difference between the actual voltage and the reference value, is formulated as follows:

$$e = V_{out} - V_{out}^* \tag{3}$$

where $V_{out}^*$ is the reference voltage for the output voltage, which is constant and its derivative is zero ($\dot{V}_{out}^* = 0$). The derivative of the error is derived as follows:

$$\dot{e} = \frac{1}{C_{b2}}\left(i_{Ld} - \frac{V_{out}}{R_L}\right) \tag{4}$$

As $i_{L_d}$ emerges in (4), it serves as an intermediary variable within the backstepping control scheme. Introducing a virtual control variable $\phi$ corresponding to $i_{L_d}$ (i.e., $i_{L_d} \approx \phi$) is necessary to analyze the stability of $\dot{e}$ using the subsequent control Lyapunov function:

$$W = \frac{1}{2}e^2 \tag{5}$$

Equation (5) satisfies the Lyapunov criteria such as $W(0)=0$, $W>0$ if only $e \neq 0$, and $W \to \infty$ if $|e| \to \infty$. Lyapunov stability theory states that the stability of the system can be guaranteed if $\dot{W}<0$, so first the derivative of the Lyapunov function is derived as follows:

$$\dot{W} = e * \dot{e} \tag{6}$$

For assuring $\dot{W}<0$, the following condition should be satisfied $$\dot{e} = -K_1 e \tag{7}$$

where $K_1$ is a positive gain. By substituting (4) into (7), the following can be obtained:

$$\frac{1}{C_{b2}}\left(i_{Ld} - \frac{V_{out}}{R_L}\right) = -K_1(V_{out} - V_{out}^*) \tag{8}$$

Then the parameter $\phi$ ($i_{L_d} \approx \phi$) can be derived as follows:

$$\phi = -K_1 C_{b2}(V_{out} - V_{out}^*) + \frac{V_{out}}{R_L} \tag{9}$$

In the next step, the passivity-based control method can be constructed to drive the inductor current to its reference, provided by the backstepping control, where the desired inductor current is $\phi$ ($i_{L_d}^* = \phi$). The Euler-Lagrange (EL) representation of the passivity control can be written as follows:

$$M\dot{x} + (J + R(x))x = G\mu + d \tag{10}$$

where $x \in R^n$ is the state vector, $u \in R^m$ (where m<n) is the control action, and $M>0$ is the generalized inertia. The $J(x)=-J^T(x)$ and $R(x)=R^T(x)>0$ are defined as the natural interconnection and damping matrices, respectively. The state vector is defined as $x=[i_{Ld}, V_{Cb1}, V_{out}]^T$, and the stored energy can be expressed as follows:

$$H = \frac{1}{2}x^T M x = \frac{1}{2}L_d i_{Ld}^2 + \frac{1}{2}C_{b1}V_{Cb1}^2 + \frac{1}{2}C_{b2}V_{out}^2 \tag{11}$$

The matrices M, J, R(x), G, and d can be expressed as follows:

$$M = \begin{bmatrix} L_d & 0 & 0 \\ 0 & C_{b1} & 0 \\ 0 & 0 & C_{b2} \end{bmatrix}, J = \begin{bmatrix} 0 & 0 & 1 \\ 0 & 0 & 0 \\ -1 & 0 & 0 \end{bmatrix}$$

$$R(x) = \begin{bmatrix} 0 & 0 & 0 \\ 0 & 0 & 0 \\ 0 & 0 & \frac{1}{R_L} \end{bmatrix}, G = \begin{bmatrix} V_{Cb1} \\ -i_{Ld} \\ 0 \end{bmatrix}, d = \begin{bmatrix} 0 \\ i_{in} \\ 0 \end{bmatrix}$$

The passivity-based control strategy can employ a dual-phase approach to effectively reduce energy oscillations in inductors and capacitors. This approach can integrate damping gains into the control scheme, thereby enhancing stability and performance. The two phases of this strategy can be referred to as the energy shaping stage and the damping injection stage.

In the energy shaping stage, the state vectors can be redefined as $X=x_d+\tilde{x}$, where $x_d$ denotes the desired values (specifically, $x_d=[\phi, V_{Cb1}^*, V_{out}^*]^T$), and $\tilde{x}$ represents the deviation from these desired values. Upon substituting (10), the following can be obtained:

$$M\dot{\tilde{x}} + [J + R((x))]\tilde{x} = G\mu + d - (M\dot{x}_d + [J + R(x)]x_d) \tag{12}$$

For the damping injection stage, the damping matrix can be rewritten as $R(x)=R_i(x)-R_d$, where $$R_d = \begin{bmatrix} R_{d1} & 0 & 0 \\ 0 & \frac{1}{R_{d2}} & 0 \\ 0 & 0 & \frac{1}{R_{d3}} \end{bmatrix}, R_i = \begin{bmatrix} R_{d1} & 0 & 1 \\ 0 & \frac{1}{R_{d2}} & 0 \\ 0 & 0 & \frac{1}{R_{d3}} + \frac{1}{R_L} \end{bmatrix}$$

Then by substituting $R(x)=R_i(x)-R_d$ in to (12), the following can be obtained:

$$M\dot{\tilde{x}} + [J + R_i((x))]\tilde{x} = G\mu + d - (M\dot{x}_d + [J + R(x)]x_d) + R_d\tilde{x} \tag{13}$$

The inclusion of virtual resistances can facilitate the dissipation of transient energy within the system, in accordance with Lyapunov stability principles. As a result, the system can attain full passivity, causing the left-hand side of (13) to converge towards a globally asymptotically stable equilibrium point, denoted as x̃≈0. This lays the groundwork for stable control design, which can be elaborated upon by describing (13) as follows:

$$G\mu + d - (M\dot{x}_d + [J + R(x)]x_d) + R_d\tilde{x} = 0 \quad (1)$$

Given that the reference values remain constant, $\dot{x}_d$=0. Therefore, the matrices in (14) can be expanded and each row can be isolated as follows:

$$\begin{cases} V_{Cb1}\mu - V_{out} + R_{d1}(i_{Ld} - \phi) = 0 \\ -i_{Ld}\mu + i_{in} + \dfrac{1}{R_{d2}}(V_{Cb1} - V^*_{Cb1}) = 0 \\ i_{Ld} - \dfrac{1}{R_L}V_{out} + \dfrac{1}{R_{d3}}(V_{out} - V_{out}) = 0 \end{cases} \quad (15)$$

The duty cycle can be derived as follows:

$$\mu = \frac{V_{out} - R_{d1}(i_{Ld} - \phi)}{V_{Cb1}} \quad (16)$$

$$\mu = \frac{i_{in} + \dfrac{1}{R_{d2}}(V_{Cb1} - V^*_{Cb1})}{i_{Ld}} \quad (17)$$

Figure 3A:
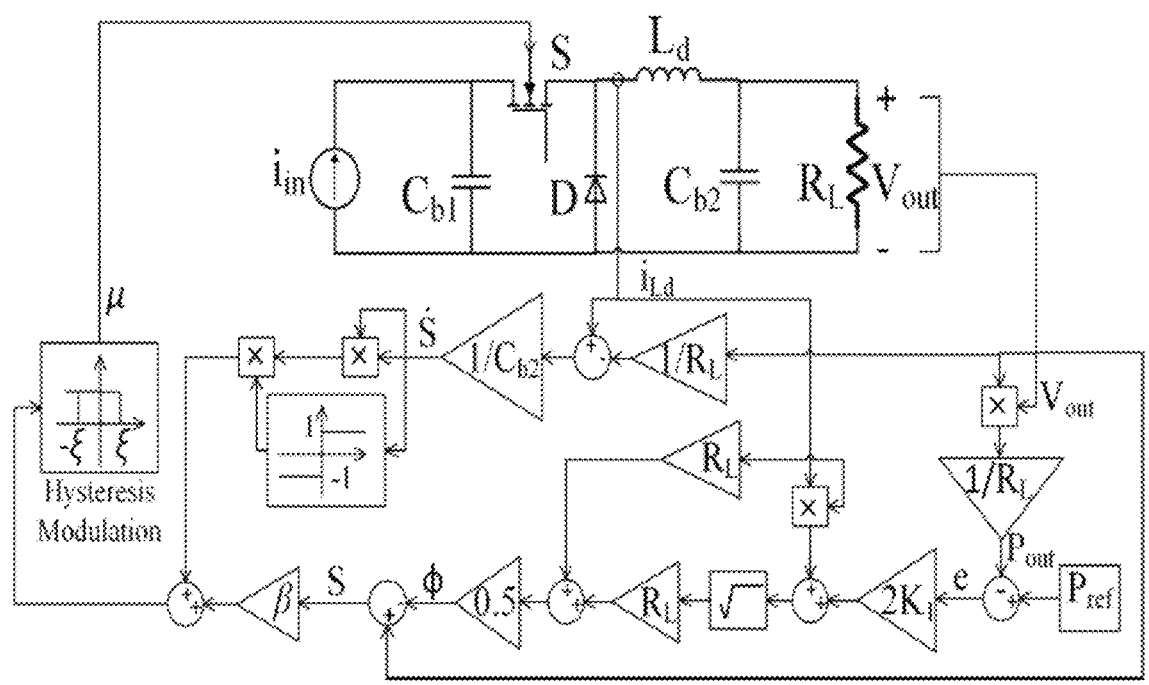
FIG. 3A shows a block diagram of a controller that can be used with DWC, according to an embodiment of the subject invention.
Figure 3B:
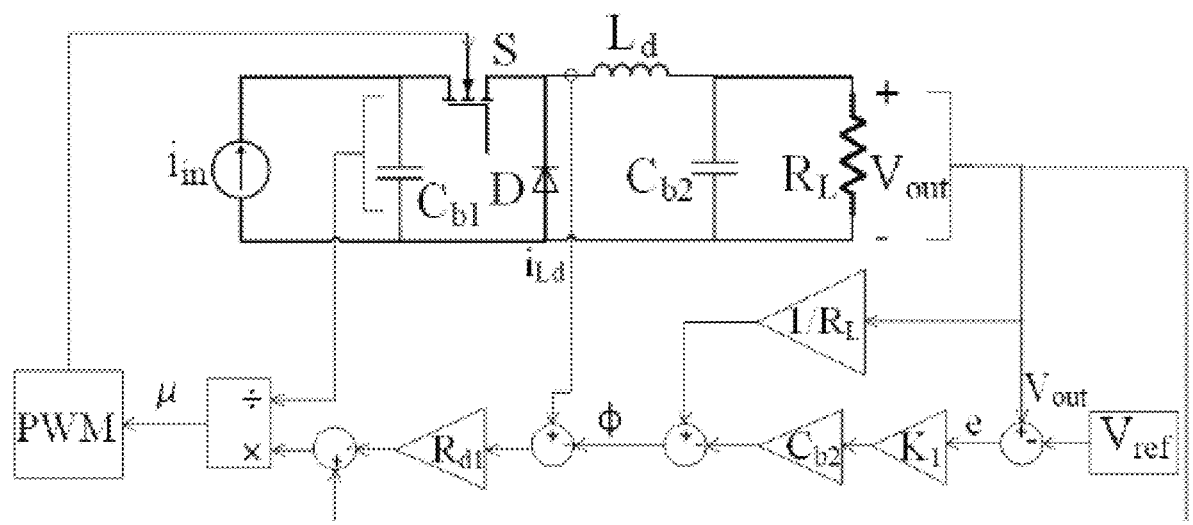
FIG. 3B shows a block diagram of a controller that can be used with DWC, according to an embodiment of the subject invention.
Figure 3C:
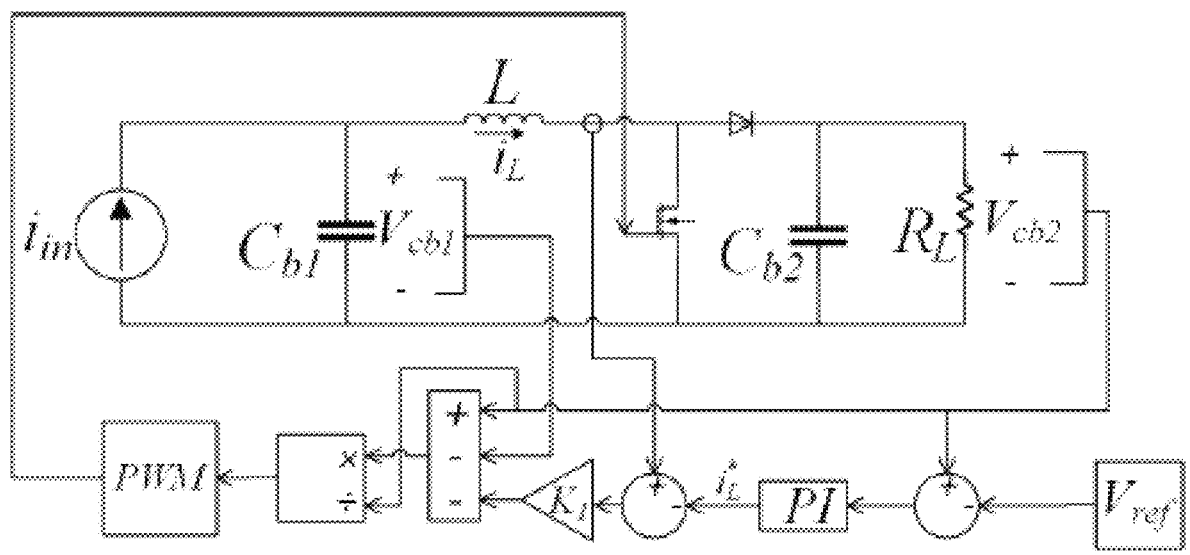
FIG. 3C shows a block diagram of a controller that can be used with DWC, according to an embodiment of the subject invention.

The output current of the full-bridge rectifier is a high-frequency sinusoidal half-wave signal, rendering it impractical to be accurately measured by the current sensor. Consequently, (17), which involves the variable $i_{in}$, is not considered for selection as a duty-cycle. Therefore, the duty cycle expressed in (16) can be chosen as the duty cycle for the proposed controller. FIGS. 3A-3C show block diagrams of control strategies of embodiments of the subject invention.

FIG. 19 illustrates an inductive coupler employing bipolar coils on both the transmitter and receiver sides. Some example dimensions of the transmitter coils and receiver coil are listed in the table in FIG. 17.

Because the double-sided series compensation network has a current source characteristic, the input of the DC-DC buck converter can be modeled as an ideal current source represented by the $i_{in}$ as shown in FIG. 2A. The equations for average state model of the buck converter are shown in (2) above. Because an important goal is to achieve the desired power level at the output of the DC-DC buck converter, it is important to determine the switching control strategy based on considerations of robustness and stability.

First, the design of the composite control strategy can start with the design of the backstepping controller. The error for tracking power between the reference value and actual power can be defined as follows:

$$e = P - P_{ref} \quad (18)$$

where the output power is derived as follows:

$$P = \frac{V_{out}^2}{R_L} = \frac{V_{C_{b2}}^2}{R_L} \quad (19)$$

The derivative of the error is as follows:

$$\dot{e} = \frac{2V_{C_{b2}}}{R_L}\left(i_{Ld} - \frac{V_{C_{b2}}}{R_L}\right) - \dot{P}_{ref} \quad (20)$$

As $V_{cb2}$ emerges in (20), it can be regarded as an intermediary variable within the backstepping control scheme. Introducing a virtual control variable ($\phi$) corresponding to $V_{Cb2}$ (i.e., $V_{cb2}\approx\phi$) is required for analyzing the stability of $\dot{e}$ using the subsequent control Lyapunov function:

$$W = \frac{1}{2}e^2 \quad (21)$$

Equation 21 satisfies the Lyapunov criteria such as W(0)=0, W>0 if only e≈0, and W→∞ if |e|→∞. Lyapunov stability theory states that the stability of the system can be guaranteed if W'<0, so first the derivative of the Lyapunov function can be derived as follows:

$$\dot{W} = e*\dot{e} \quad (22)$$

In order to assure $\dot{W}$<0, the following condition should be satisfied $$\dot{e} = -K_1 e \quad (23)$$

where $K_1$>0, so the following equation can be solved to derive the voltage reference ($\phi$) for the sliding mode control $$\phi^2 - R_L i_{L_d}\phi - \frac{K_1 e R_L^2}{2} = 0 \quad (24)$$

and by solving Equation 24, the voltage reference for the second-order sliding mode controller can be derived as follows:

$$\phi = \frac{R_L i_{L_d} + R_L\sqrt{i_{L_d}^2 + 2K_1 e}}{2} \quad (25)$$

In the next step, the second order sliding mode controller can be designed by defining the sliding variable s=$V_{out}$–$\phi$. Assuming a second degree for the sliding variable(s) in relation to the controller (U), this can be represented as follows:

$$\ddot{s} = a(t, x) + b(t, x)U \quad (26)$$

Assuming $V_{out}^{max}$ and $L_{L_d}^{max}$ are the maximum value of $V_{out}$ and $i_{L_d}$, respectively. Then the following estimation can be obtained:

$$0 \le V_{out} \le \phi + \Delta_1 \quad (27)$$

$$0 \le i_{L_d} \le \frac{\phi}{R_L} + \Delta_2$$

where $\Delta_1$ and $\Delta_2$ are small values as a result of perturbation. By defining $\Delta=\max(\Delta_1, \Delta_2)$ and by substituting (27) into $a(t,x)$ formula, the following can be obtained:

$$a(t, x) \leq \left| \frac{1}{(R_L C_{b2})^2} - \frac{1}{L_d C_{b2}} \right| (\phi + \Delta) - \left| \frac{1}{R_L C_{b2}^2} \right| \left( \frac{\phi}{R_L} + \Delta \right) \quad (28)$$

By assuming a positive constant ($d>0$) as follows:

$$\left| \frac{1}{(R_L C_{b2})^2} - \frac{1}{L_d C_{b2}} \right| \Delta + \left| \frac{\Delta}{R_L C_{b2}^2} \right| \leq d \quad (29)$$

Equation 28 can be simplified as follows:

$$a(t, x) \leq \left| \frac{1}{(R_L C_{b2})^2} - \frac{1}{L_d C_{b2}} \right| \phi - \left| \frac{\phi}{R_L C_{b2}^2} \right| \quad (30)$$

and the following condition is hold for $b(t,x)$:

$$\frac{V_{C_{b1}}}{L_d C_{b2}} > \left| \frac{1}{(RC)^2} - \frac{1}{LC} \right| v_{ref} + \frac{v_{ref}}{(RC)^2} + d + \beta + \frac{27}{4\beta^{\frac{3}{2}}} + \frac{3\beta^{\frac{11}{6}}}{2^{\frac{7}{3}}} + \frac{1}{4}\beta^{\frac{1}{2}} \quad (31)$$

In designing the second-order sliding mode controller U under the condition described in (31) that output voltage can track the reference value ($\phi$) the controller can be designed as follows:

$$U = -\text{sign}(\lfloor \dot{s} \rfloor^2 + \beta s) \quad (32)$$

For simplification $\lfloor x \rfloor^2 = |x|^2 \text{sign}(x)$ and $\beta$ is a positive constant. Now, it is necessary to demonstrate that the controller defined (32) can achieve finite-time stabilization for the second order sliding mode control dynamics described in (26), which means by deploying the controller in (32), the output voltage can track the reference value ($\phi$). First, it is assumed that $y_1=s$ and $y_2=\dot{s}$, so the dynamic of system and the controller equation can be written as follows:

$$\dot{y}_1 = y_2, \quad \dot{y}_2 = a(t, x) + b(t, x)U \quad (33)$$

$$U = -\text{sign}(\lfloor y_2 \rfloor^2 + \beta y_1) \quad (34)$$

Now, the finite-time stability of the closed-loop system, as expressed in (33) and (34), will be demonstrated. During the finite-time stability proof, Lemma 2 can be employed and can be expressed as follows:

$$|x|^c |y|^d \leq \frac{c}{c+d} \gamma |x|^{c+d} + \frac{d}{c+d} \gamma^{-\frac{c}{d}} |y|^{c+d} \quad (35)$$

The finite-time stability proof can be started by choosing a Lyapunov function as follows:

$$V(y_1, y_2) = \frac{2}{5}|y_1|^{\frac{5}{2}} + \frac{2}{5}|\alpha|^{\frac{5}{2}} \quad (36)$$

where $$\alpha = \lfloor y \rfloor^2 + \beta y$$

$$\dot{V}(y_1, y_2) = |y_1|^{\frac{3}{2}} \dot{y}_1 + |\alpha|^{\frac{3}{2}} \beta \dot{y}_1 + |\alpha|^2 \dot{y}_2 \quad (37)$$

$$\dot{V}(y_1, y_2) = |y_1|^{\frac{3}{2}} y_2 + |\alpha|^{\frac{3}{2}} \beta y_2 + |\alpha|^2 \dot{y}_2 \quad (38)$$

By substituting $$y_2 = \lfloor \alpha \rfloor^{\frac{1}{2}} - \beta^{\frac{1}{2}\frac{y_1^{\frac{1}{2}}}{1}}$$

in Equation 37, the following can be obtained:

$$\dot{V}(y_1, y_2) = -\beta^{\frac{1}{2}}|y_1|^2 + |y_1|^{\frac{3}{2}}|\alpha|^{\frac{1}{2}} + \beta|\alpha|^2 + \beta^{\frac{3}{2}}|y_1|^{\frac{1}{2}}|\alpha|^{\frac{3}{2}} + |\alpha|^2 \dot{y}_2 \quad (39)$$

Each term of the right side can be estimated based on Lemma 2 as follows:

$$|y_1|^{\frac{3}{2}}|\alpha|^{\frac{1}{2}} \leq \frac{3}{4}\gamma|y_1|^2 + \frac{1}{4}\gamma^{-3}|\alpha|^2 \quad (40)$$

By choosing $$\frac{3}{4}\gamma = \frac{\beta^{\frac{1}{2}}}{4} \text{ then } \gamma = \frac{\beta^{\frac{1}{2}}}{3}$$

Equation 40 can be written as follows:

$$|y_1|^{\frac{3}{2}}|\alpha|^{\frac{1}{2}} \leq \frac{\beta^{\frac{1}{2}}}{4}|y_1|^2 + \frac{27}{4\beta^{\frac{3}{2}}}|\alpha|^2 \quad (41)$$

$$\beta^{\frac{3}{2}}|y_1|^{\frac{1}{2}}|\alpha|^{\frac{3}{2}} \leq \frac{\beta^{\frac{3}{2}}}{4}\gamma|y_1|^2 + \frac{3\beta^{\frac{3}{2}}}{4}\gamma^{-\frac{1}{3}}|\alpha|^2 \quad (42)$$

By choosing $$\frac{\beta^{\frac{3}{2}}}{4}\gamma = \frac{\beta^{\frac{1}{2}}}{2} \text{ then } \gamma = \frac{2}{\beta},$$

Equation 42 can be written as follows:

$$\beta^{\frac{3}{2}}|y_1|^{\frac{1}{2}}|\alpha|^{\frac{3}{2}} \leq \frac{\beta^{\frac{1}{2}}}{2}|y_1|^2 + \frac{3\beta^{\frac{11}{6}}}{2^{\frac{7}{3}}}|\alpha|^2 \quad (43)$$

$$\dot{V}(y_1, y_2) \leq -\frac{\beta^{\frac{1}{2}}}{4}|y_1|^2 + \left( \beta + \frac{27}{4\beta^{\frac{3}{2}}} + \frac{3\beta^{\frac{11}{6}}}{2^{\frac{7}{3}}} + \dot{y}_2 \right)|\alpha|^2 \quad (44)$$

where $\dot{y}_2 = a(t, x) + b(t, x)U$, and $U = -\text{sign}(\lfloor y_2 \rceil)^2 + \beta y_1 = \alpha$ where $$\dot{y}_2 = a(t, x) + b(t, x)U, \text{ and} \quad (46)$$

$$U = -\text{sign}(\lfloor y_2 \rceil)^2 + \beta y_1 = \alpha$$

$$\dot{V}(y_1, y_2) = -\frac{\beta^{\frac{3}{2}}}{4}|y_1|^2 + \left(\beta + \frac{27}{4\beta^{\frac{3}{2}}} + \frac{3\beta^{\frac{11}{6}}}{2^{\frac{7}{3}}} + |a(t, x)| - b(t, x)\text{sign}(\alpha)\right)|\alpha|^2$$

where $$|a(t, x)| \le \left|\frac{1}{(RC)^2} - \frac{1}{LC}\right||v_{ref} + \frac{v_{ref}}{(RC)^2} + d \text{ and}$$

$$b(t, x) = \frac{V_{in}}{LC}, \text{ which}$$

$$\frac{V_{in}}{LC} > \left|\frac{1}{(RC)^2} - \frac{1}{LC}\right||v_{ref} + \frac{v_{ref}}{(RC)^2} + d + \beta + \frac{27}{4\beta^{\frac{3}{2}}} + \frac{3\beta^{\frac{11}{6}}}{2^{\frac{7}{3}}} + \frac{1}{4}\beta^{\frac{1}{2}} \quad (47)$$

so $\dot{V}(y_1, y_2)$ can be simplified as follows:

$$\dot{V}(y_1, y_2) = -\frac{\beta^{\frac{1}{2}}}{4}(|y_1|^2 + |\alpha|^2) \quad (48)$$

Then, $$\dot{V}(y_l, y_2) + cV^n(y_1, y_2) \le 0 \text{ where } n = \frac{4}{5}$$

and $$c = \frac{8}{5}\beta^{-\frac{1}{2}} \text{ which } 0 < n < 1$$

and based on the finite-time stability theory, it has been verified that the system described in Equation 26, under the governance of the controller presented in Equation 32, achieves global finite-time stabilization (see also, Bhat and Bernstein, Finite-time stability of continuous autonomous systems," SIAM Journal on Control and optimization, vol. 38, no. 3, pp. 751-766, 2000; which is hereby incorporated by reference herein in its entirety). In the practical deployment second-order sliding mode (SOSM) controller, it is important to recognize that the sign function in Equation 32 may give rise to a very high switching frequency when the sliding variables reach $\lfloor \dot{s} \rceil^2 + \beta = 0$. Therefore, the switching frequency can be limited to a range by deploying hysteresis modulation. The controller can be redesigned as follows:

$$\mu = \begin{cases} 1 & \text{when } \lfloor \dot{s} \rceil^2 + \beta s < -\xi \\ 0 & \text{when } \lfloor \dot{s} \rceil^2 + \beta s > \xi \\ \text{unchanged} & \text{otherwise} \end{cases} \quad (49)$$

where $\zeta$ is a small constant, which defines a range as follows:

$$\lambda = -\xi < \lfloor \dot{s} \rceil^2 + \beta s < -\xi \quad (50)$$

Through this adjustment, the switching operation can be prevented or inhibited from occurring within the region 2, thereby alleviating the issue of very high switching frequency in SOSM control. The block diagram of the controller is shown in FIG. 3A.

Embodiments of the subject invention provide robust composite control that combine a second-order sliding mode with backstepping control to stabilize power regardless of mutual coupling variation and load changing simultaneously. The control can be applied to a DC-DC Buck converter at the receiver side to regulate the output power. Simulation and experimental results validate the effectiveness of the composite controller in stabilizing power at the reference value regardless of mutual coupling variation and load change, minimizing fluctuation to less than 1% (e.g., ±0.1%). Moreover, the controller can consistently maintain an efficiency of at least 80% (e.g., 84% or at about 84%) across varied positions as the electric vehicle traverses over the transmitter coils. The controller can have a fast dynamic response to changing in coupling coefficient and load. The proposed controller does not require a detection system, which makes it cost-effective and practical for dynamic charging applications. The controller can minimize power pulsation to under 1% (e.g., 0.1% or less) and maintain efficiency over 80% (e.g., 84%) as the vehicle is traveling.

Embodiments of the subject invention provide systems and methods for control based on the Lyapunov function (see also FIG. 3C), for suppressing power fluctuation and stabilizing power during DWC of electric vehicles. DWC can suffer from power pulsation due to variation of mutual coupling as the vehicle is traveling across transmitter coils, and this power fluctuation can deteriorate the battery's health. Embodiments of the subject invention can address this issue via a Lyapunov function-based control method to regulate the output voltage by controlling a boost converter at the secondary side. The controller can be effective in providing smooth power while load and mutual coupling vary simultaneously, which demonstrates that the dynamic response of the system is fast for adapting to different load conditions while mutual coupling is fluctuating. The controller does not require a detection system, which makes it cost-effective and practical for dynamic charging applications. The controller can have a fast dynamic response to changing in coupling coefficient and load. Results validate the effectiveness of the controller of FIG. 3C in suppressing fluctuations in both output voltage and power, with fluctuation rates limited to 0.25% and 0.55%, respectively.

Referring again to FIG. 1, as a series compensation network is used, the entire IPT system before the boost converter can be modeled as a current source. The state space equations are as follows:

$$\frac{di_L}{dt} = \frac{1}{L}[V_{cb1} - V_{cb2} + DV_{cb2}] \quad (51)$$

$$\frac{dV_{cb1}}{dt} = \frac{1}{C_{b1}}[i_L + i_{in}] \quad (52)$$

-continued
$$\frac{dV_{cb2}}{dt} = \frac{1}{C_{b2}}\left[i_L - Di_L - \frac{V_{cb2}}{R}\right] \quad (53)$$

where $i_L$, $V_{cb1}$, $V_{cb2}$, and D represent the inductor current, input capacitor voltage, output voltage, and duty cycle of the boost converter metal oxide semiconductor field effect transistor (0M OSFET), respectively. By defining the state variables as $$X_1 = i_L - i_L^*, x_2 = V_{cb1} - VV_{cb1}^*,$$

and $x_3 = V_{cb2} - V^*_{cb2}$, where variables with superscript "*" are the reference values, the Lyapunov function is defined as:

$$V(x) = \frac{1}{2}L(i_L - i_L^*)^2 + \frac{1}{2}C_{b1}(V_{cb1} - V_{cb1}^*)^2 + \frac{1}{2}C_{b2}(V_{cb2} - V_{cb2}^*)^2 \quad (54)$$

Equation 54 stratifies the Lyapunov criteria such as V(0)=0, V(x)>0 if only x≠0 and V(x)→∞ if |x|→∞. Lyapunov's stability theory states that the stability of the system can be guaranteed if $\dot{V}(x) < 0$, so first the derivative of Lyapunov function is derived as follows:

$$\dot{V}(x) = Lx_1\dot{x}_1 + C_{b1}x_2\dot{x}_2 + C_{b2}x_3\dot{x}_3 \quad (55)$$

To assure $\dot{V}(x) < 0$ for any x≠0 is correct, $\dot{x}_1$, $\dot{x}_2$, and $\dot{x}_3$ can be defined as follows:

$$\dot{x}_1 = -K_1\frac{x_1}{L}, \dot{x}_2 = -K_2\frac{x_2}{C_{b1}}, \dot{x}_3 = -K_3\frac{x_3}{C_{b2}} \quad (56)$$

where $K_1 > 0$, $K_2 > 0$, $K_3 > 0$, and by substituting (56) into (51), (52), and (53), the following equation for duty cycles can be derived:

$$D = \frac{V_{cb2} - V_{cb1} - K_1(i_L - i_L^*)}{V_{cb2}} \quad (57)$$

FIG. 1 shows the circuit topology of a LCC-LCC (where LCC means inductor-capacitor-capacitor) compensated DWC system. A DC-DC boost converter can be added to the vehicle side to regulate the output voltage through the utilization of a Lyapunov function-based controller. As depicted in FIG. 1, $k_{pj-2}$ denotes the mutual coupling coefficient between the jth transmitter coil $L_{jk}$ and the receiver coil $L_2$. Additionally, $k_{p1-p2}$ and $k_{p2-p3}$ signify the mutual coupling coefficient between adjacent transmitter coils. The LCC-LCC compensation network can be chosen for the DWC system due to its high efficiency. In this configuration, $L_{fp1}$, $L_{fp2}$, and $L_{fp3}$ represent the compensation inductors, while $C_{fp1}$, $C_{fp2}$, and $C_{fp3}$ denote the primary parallel compensation capacitors, and $C_{p1}$, $C_{p2}$, and $C_{p3}$ represent the primary series compensation capacitors. On the receiver side, $L_{f2}$ serves as the compensation inductor, $C_{f2}$ as the parallel compensation capacitor, and $C_2$ as the series compensation capacitor.

Figure 2B:
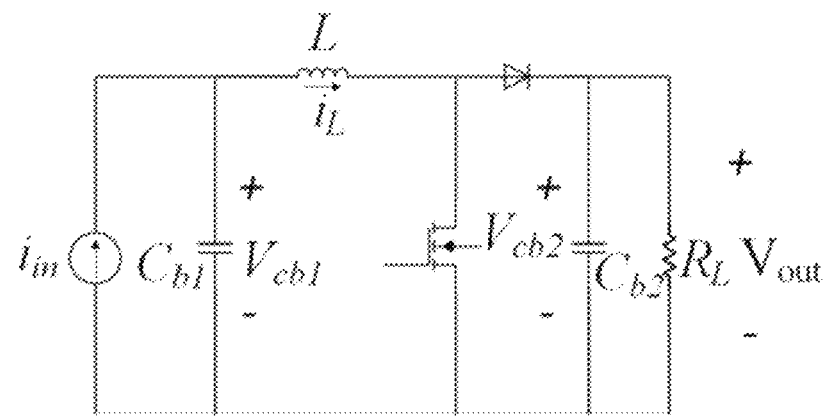
FIG. 2B shows the simplified circuit topology of a boost converter at the vehicle (i.e., receiver) side of a DWC system.

Because the double-sided LCC-LCC IPT system has the characteristic of a current source, the IPT system serving as the input of the boost converter can be modeled as a current source denoted $i_{in}$, as shown in FIGS. 2A and 2B. The $i_{in}$ can be expressed as in Equation 1 above. The state space equations of the simplified circuit topology can be expressed as in Equations 18-20 above. The Lyapunov function can be defined as in Equation 21 above, which satisfies the Lyapunov criteria such as V(0)=0, V(x)>0 if only x≠0, and V(x)→∞ if |x|→∞. Lyapunov's stability theory states that the stability of the system can be guaranteed if $\dot{V}(x) < 0$. The derivative of the Lyapunov function is shown in Equation 22. To ensure $\dot{V}(x) < 0$ for any x≠0, $\dot{x}_1$, $\dot{x}_2$, and $\dot{x}_3$ are defined as in Equation 23. The equation for duty cycles is shown in Equation 24.

Embodiments of the subject invention provide a focused technical solution to the focused technical problem of how to stabilize voltage during DWC. The solution is provided by using a composite control that combines a backstepping control approach with passivity-based control to stabilize output voltage during movement of the load (e.g., travel of the electric vehicle) and/or changing load conditions. This has many practical applications, including significantly improving the efficiency of wireless charging (and life of the vehicle battery) by stabilizing the output voltage during DWC.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

In order to confirm the efficacy of a controller as shown in FIG. 3B, its performance was assessed when the receiver is in motion with a speed of 50 kilometers per hour (km/h), and a comparison was made with a proportional integral derivative (PID) controller. In all testing conditions, the vehicle was in motion, which means the mutual coupling was varying. The table shown in FIG. 29 shows the circuit parameters descriptions and values. The PID controller parameters were chosen as $K_p$=0.05 and $k_i$=20.

Figure 20:
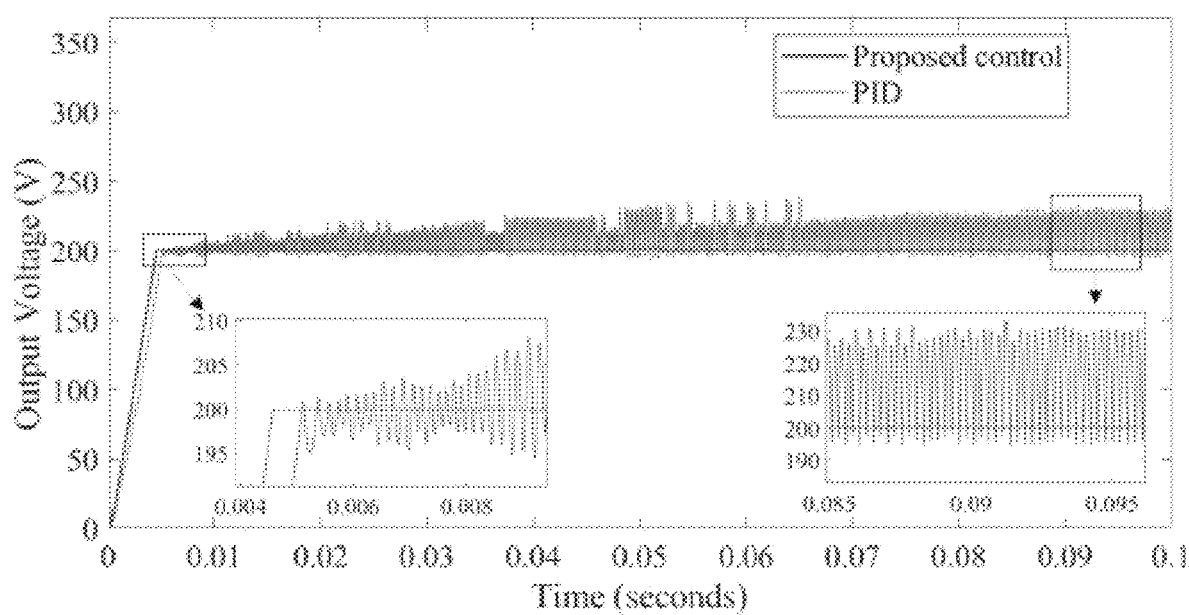
FIG. 20 shows a plot of output power (in W) versus time (in sec), showing output power when a vehicle travels at a speed of 50 km/h. The curve with the highest output power value at 0.0045 sec is for a controller according to an embodiment of the subject invention; and the other curve is for a PID controller.

FIG. 20 shows the output voltage of the DWC system as the vehicle travels over the transmitter coils at a speed of 50 km/h under different controllers: the controller of FIG. 3B; and PID controller. The comparison reveals that the controller of FIG. 3B exhibits superior transient performance, achieving faster settling times without overshoot. In contrast, the PID controller demonstrates slower reachability times with overshoot. Further, under the controller of FIG. 3B, the voltage fluctuation of the DWC was less than 2% (e.g., about 1%), whereas the PID controller shows a voltage fluctuation rate of 20%, as seen in FIG. 20.

Figure 21:
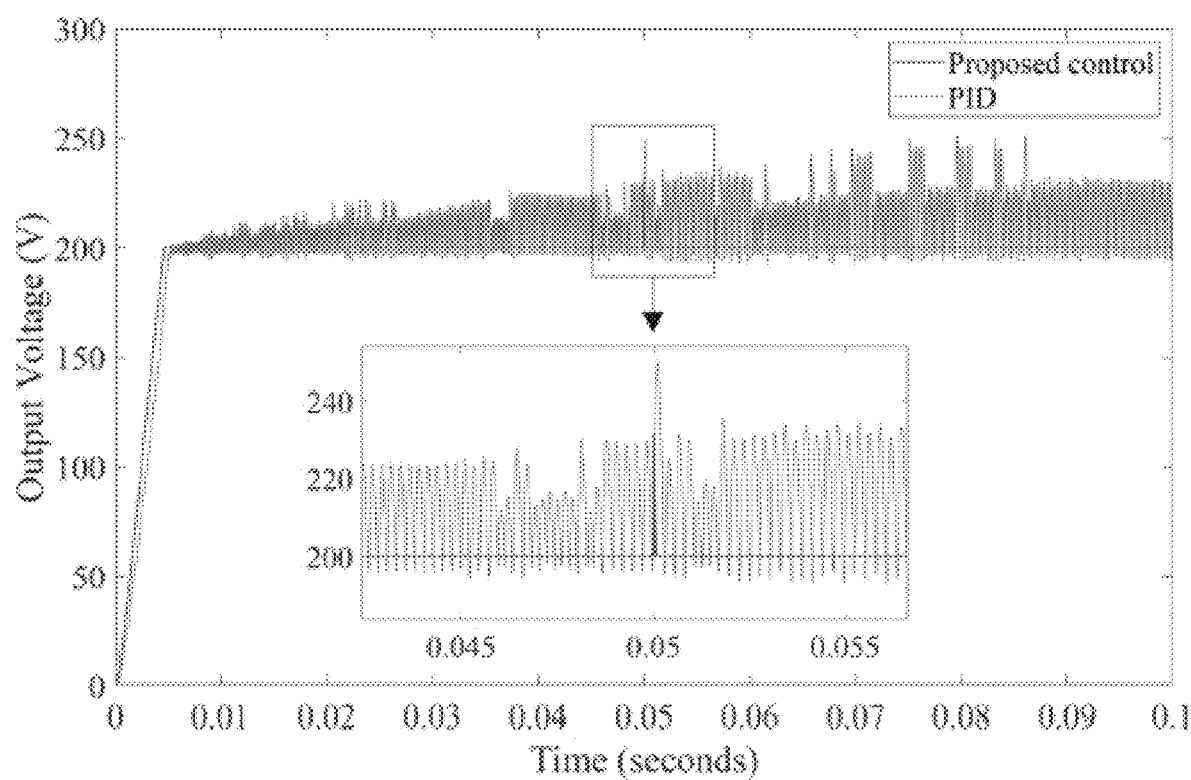
FIG. 21 shows a plot of output voltage (in Volts (V)) versus time (in sec), showing output voltage when a vehicle travels at a speed of 50 km/h and the load changes at 0.05 sec. The curve with that is relatively flat from 0.005 sec to 0.1 sec is for a controller according to an embodiment of the subject invention; and the other curve is for a PID controller.

FIG. 21 shows the output voltage during the vehicle's motion as the load transitions from 22Ω to 26Ω at 0.05 seconds. The transient response of the controller of FIG. 3B during load changes is noticeably superior to that of the PID controller. The controller of FIG. 3B exhibits lower overshoot and achieves faster convergence to the reference value. Notably, the voltage ripple under the controller of FIG. 3B remains limited to about 1% under both load conditions, whereas the voltage ripple under the PID controller increases from 20% at 22Ω to 30% at 26Ω.

Figure 22:
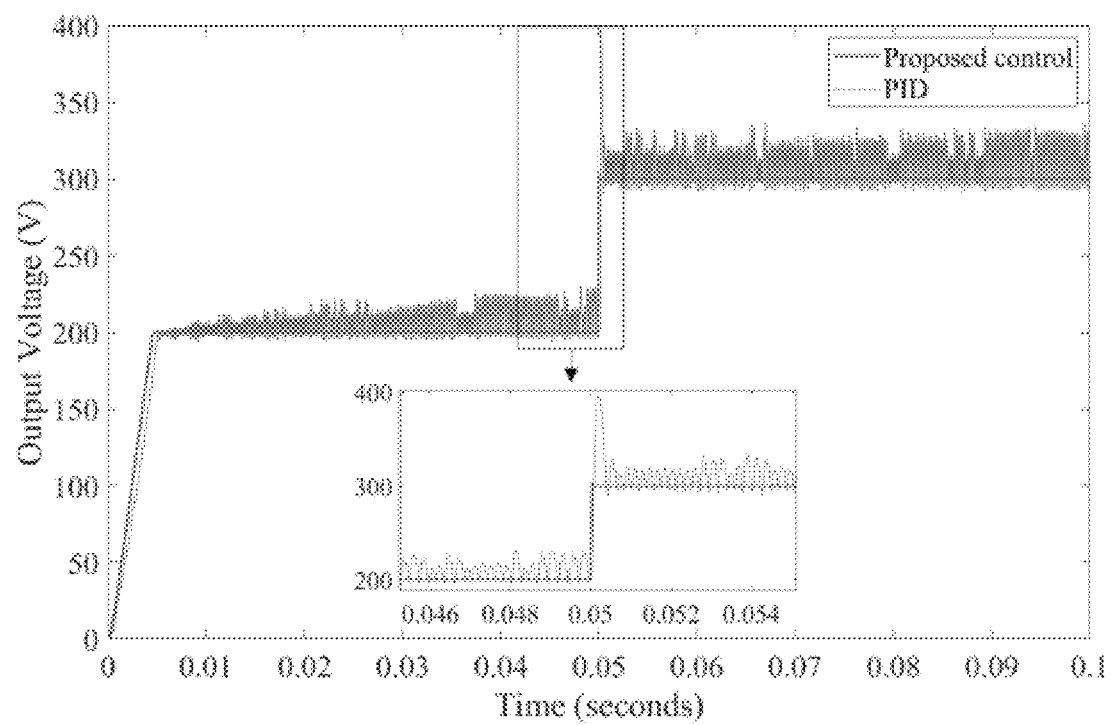
FIG. 22 shows a plot of output voltage (in V) versus time (in sec), showing output voltage while a vehicle is in motion and the voltage reference value changes at 0.05 sec. The curve with that is relatively flat from 0.005 sec to 0.1 sec is for a controller according to an embodiment of the subject invention; and the other curve is for a PID controller.

FIG. 22 shows the output voltage during the vehicle's motion, with the voltage reference transitioning from 200 V to 250 V. FIG. 22 plainly depicts the effectiveness of the controller of FIG. 3B in swiftly and smoothly responding to the dynamic change in reference value. In contrast, employing PID control results in substantial overshooting, sluggish convergence to the target value of 250 V, and observable fluctuations in the output voltage. These results underscore the superior performance of the controller of FIG. 3B in stabilizing output voltage compared to the PID controller, particularly under varying coupling coefficients and simultaneous changes in load or reference values.

Example 2

Simulations were carried out in MATLAB Simulink to validate the effectiveness of the controller shown in FIG. 3A in stabilizing power at the reference value while the coupling coefficient was varying. In the simulations, the vehicle speed was considered, given its significant impact on the rate of coupling coefficient variation and, consequently, the output power fluctuation. Therefore, a case study at a speed of 50 km/h was analyzed using the controller and compared with PID control. The reference value for power was 6 kilowatts (kW).

Figure 4:
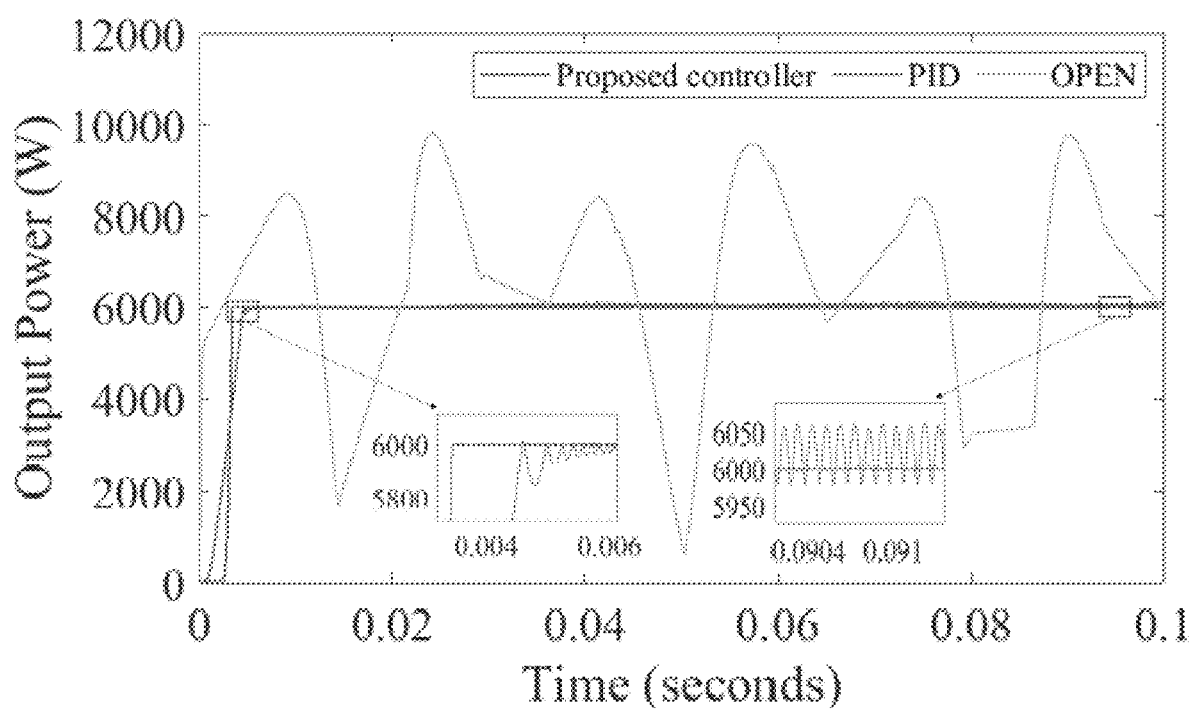
FIG. 4 shows a plot of output power (in Watts (W)) versus time (in seconds (sec)), showing output power when a vehicle travels at a speed of 50 kilometers per hour (km/h). The curve with the highest output power value at 0.06 sec is for when no controller is applied ("OPEN"); the curve with the lowest output power value at 0.004 sec is for a proportional integral derivative (PID) controller; and the curve with the second-highest output power value at 0.004 sec is for a controller according to an embodiment of the subject invention.

FIG. 4 shows the results for output power when the vehicle is traveling across transmitter coils at the speed of 50 km/h when there is no controller applied (OPEN) as well as results when the controller of FIG. 3A is used and when a PID controller is used. As shown in FIG. 4, the controller of FIG. 3A has a faster transient response than PID in reaching the power reference value (6 KW), and the pulsation in power using the controller of FIG. 3A is much lower than that of the PID controller.

Figure 5:
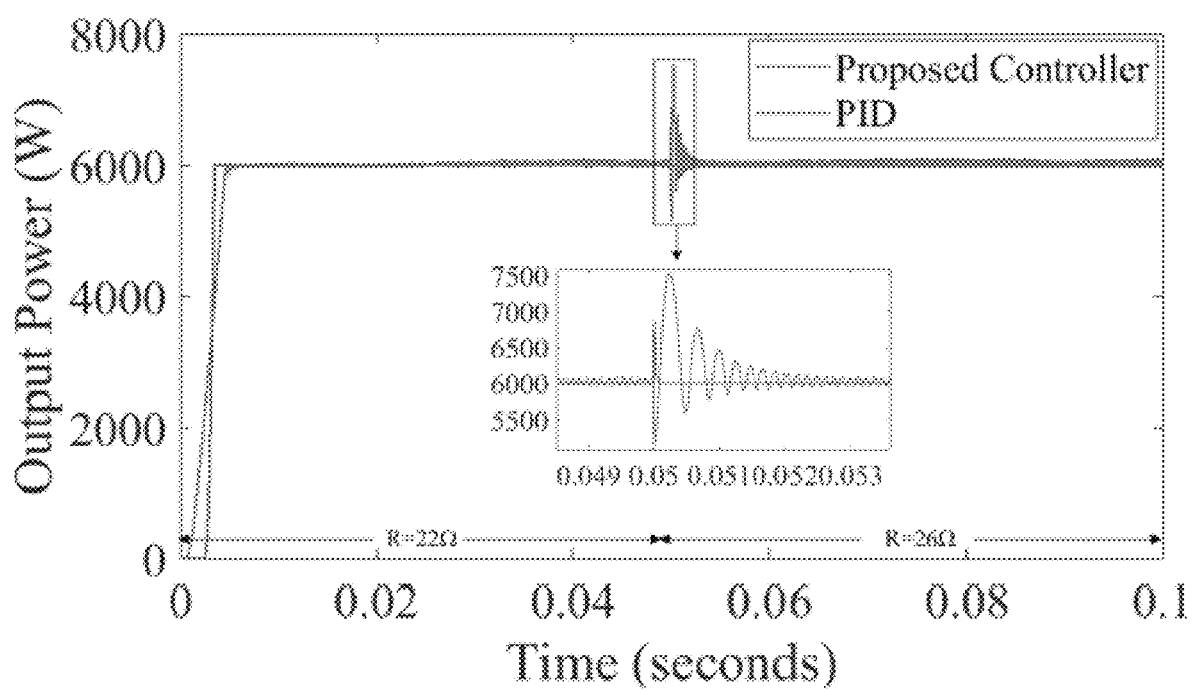
FIG. 5 shows a plot of output power (in W) versus time (in sec), showing output power when the coupling coefficient is varying and with a load change at 0.05 sec. The curve with the highest output power value at 0.0501 sec is for a PID controller; and the other curve is for a controller according to an embodiment of the subject invention.

FIG. 5 depicts the output power as the vehicle moves across transmitter coils, and the load changes from 22Ω to 26Ω at a time of 0.05 seconds. As shown in FIG. 5, the transient performance of the controller of FIG. 3A in response to load changes is significantly superior to that of the PID controller, as the PID controller exhibits a substantial overshoot in response to load variations. Additionally, the power in the controller of FIG. 3A exhibits almost zero fluctuation at different loads, while the PID controller shows fluctuations in power when tracking the reference power. Notably, the controller of FIG. 3A demonstrates a faster settling time in tracking reference power during load changes compared to the PID controller.

Figure 6:
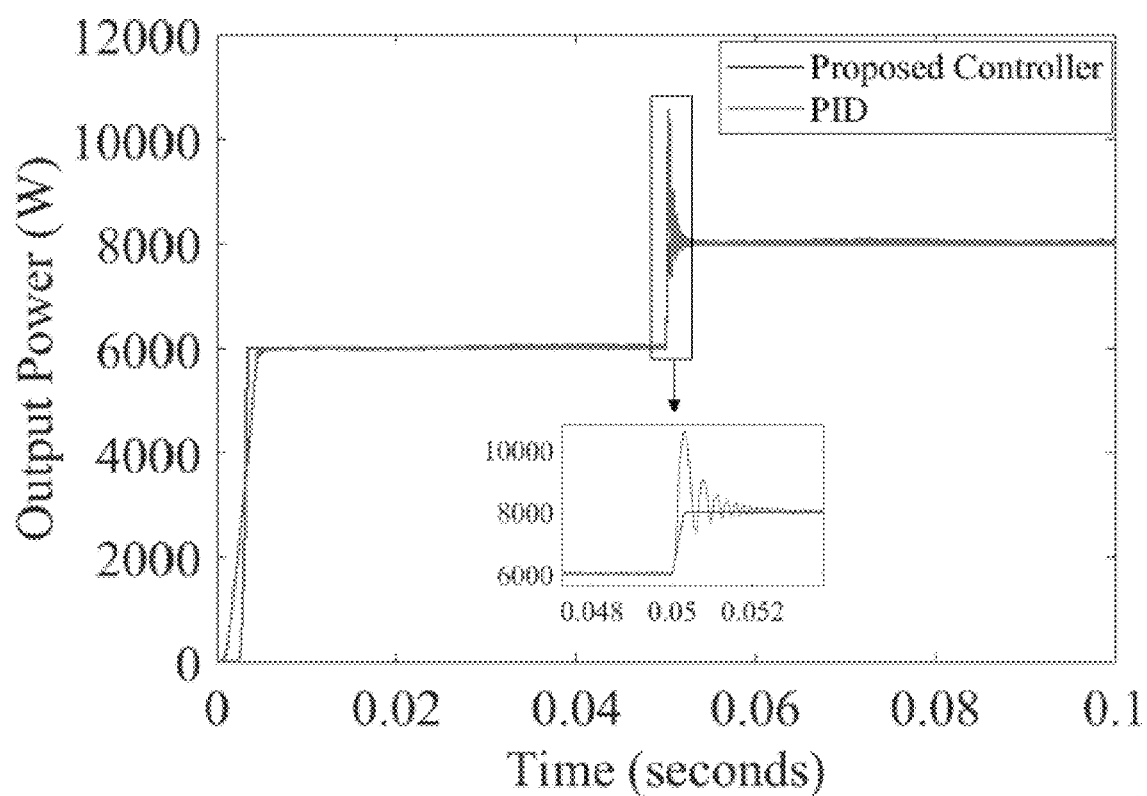
FIG. 6 shows a plot of output power (in W) versus time (in sec), showing output power while a vehicle is traveling, with the output power reference changing at 0.05 sec. The curve with the highest output power value at 0.0501 sec is for a PID controller; and the other curve is for a controller according to an embodiment of the subject invention.

FIG. 6 shows the response of the output power to a changing reference value of power from 6 KW to 8 KW at 0.05 seconds for both the controller of FIG. 3A and the PID controller. As seen in FIG. 6, the controller of FIG. 3A exhibits a smooth and fast transient response during the changing reference value without any overshooting, while the PID controller has an overshoot exceeding 10 KW. These results indicate the superiority of the controller of FIG. 3A performance over the PID controller in stabilizing power while the coupling coefficient is varying and at the same time load or reference value changing.

Example 3

To validate the effectiveness of the controller of FIG. 3A in the real world, a 415 W prototype of a DWC system with the controller was constructed. The hardware setup included the primary circuit, transmitter track, receiver pad, and secondary circuit. The primary circuit featured a series-compensation capacitor with a full-bridge single-phase inverter using silicon-carbide (SIC) MOSFETs (C2M 0025120D) to minimize conduction losses.

The transmitter track adopted a segmented coil array, with each coil utilizing a bipolar structure and AWG 36 Litz wire to reduce skin effect losses. The receiver pad, also bipolar, incorporated a CNC design with a stepper motor controlled by a Raspberry Pi to simulate the movement of an electric vehicle at a specific speed. On the secondary side, a full-bridge rectifier was paired with a buck converter at the end of the DWC system. The controller of FIG. 3A was realized by a Texas Instruments TM S320F28379D digital microcontroller to facilitate pulse wave modulation (PWM) signal generation for the buck converter based on the measurement of output current and output voltage.

Figure 7:
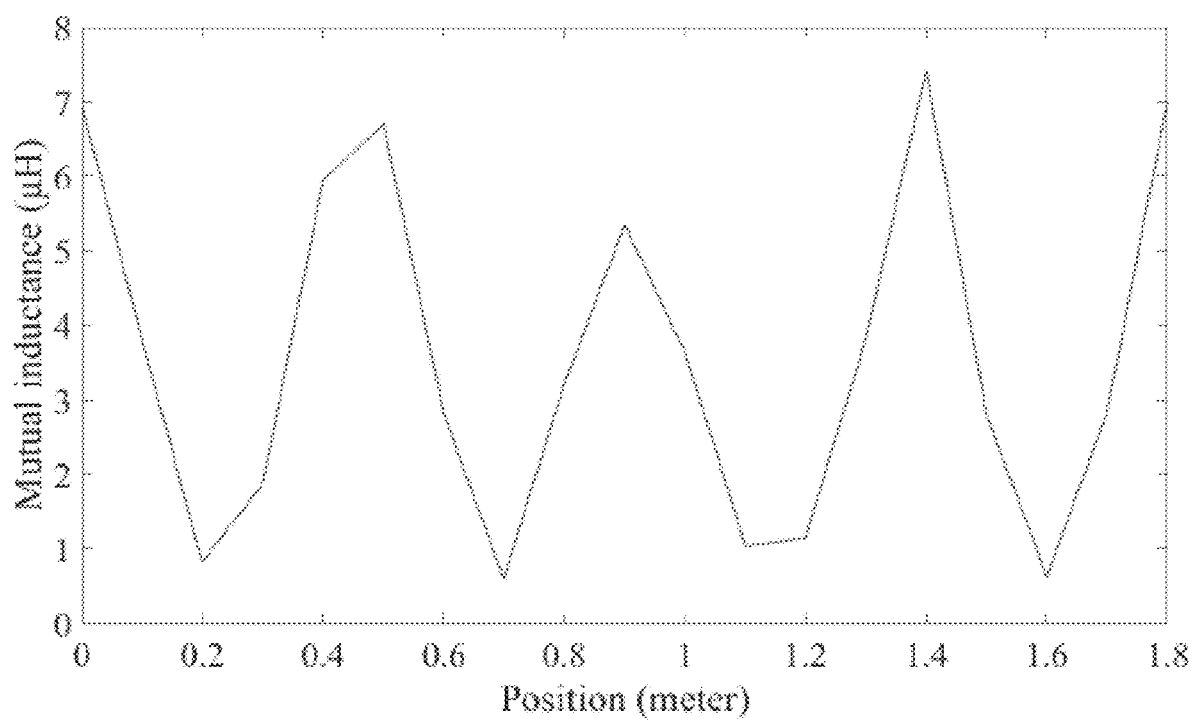
FIG. 7 shows a plot of mutual inductance (in microHenries (µH)) versus position (in meters (m)), showing mutual inductance between a receiver pad and transmitter coils.
Figure 8:
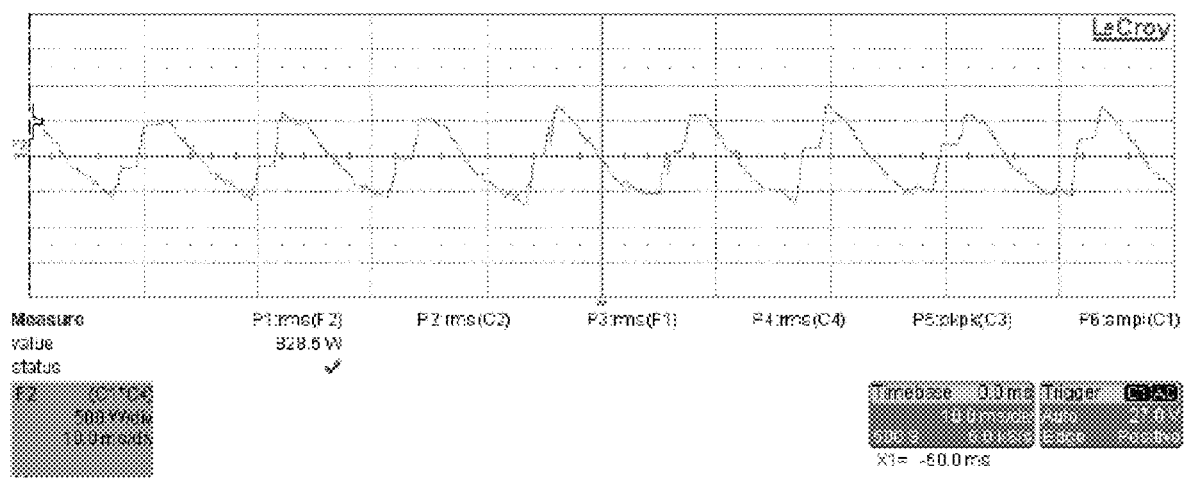
FIG. 8 shows a plot of output power without a controller.

The table in FIG. 17 displays the dimensions of the receiver pad and transmitter coils, while FIG. 7 illustrates the mutual inductance between transmitter coils and the receiver pad at various positions.

Figure 9A:
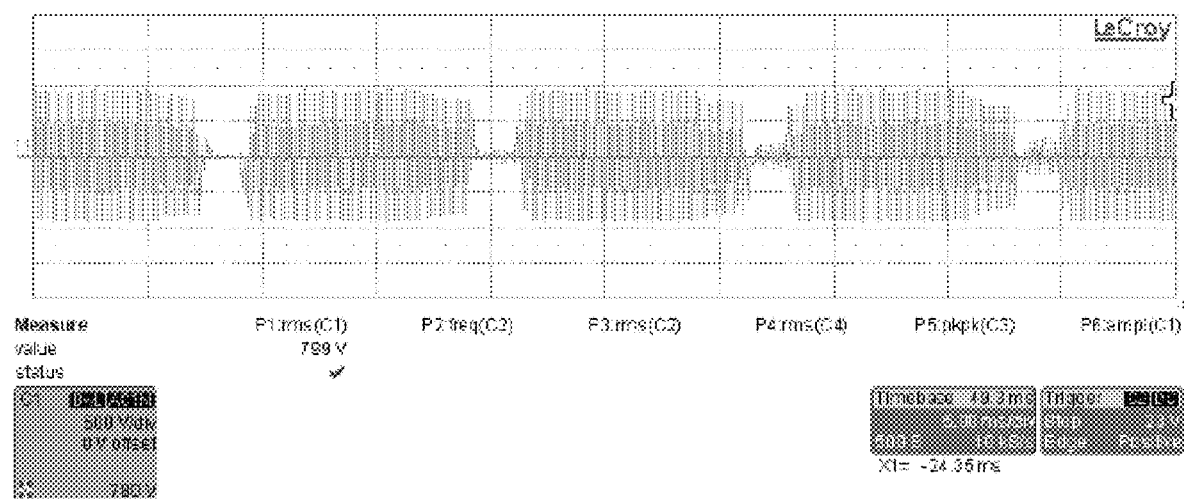
FIG. 9A shows a plot of output voltage without a controller and when a receiver is in motion.
Figure 9B:
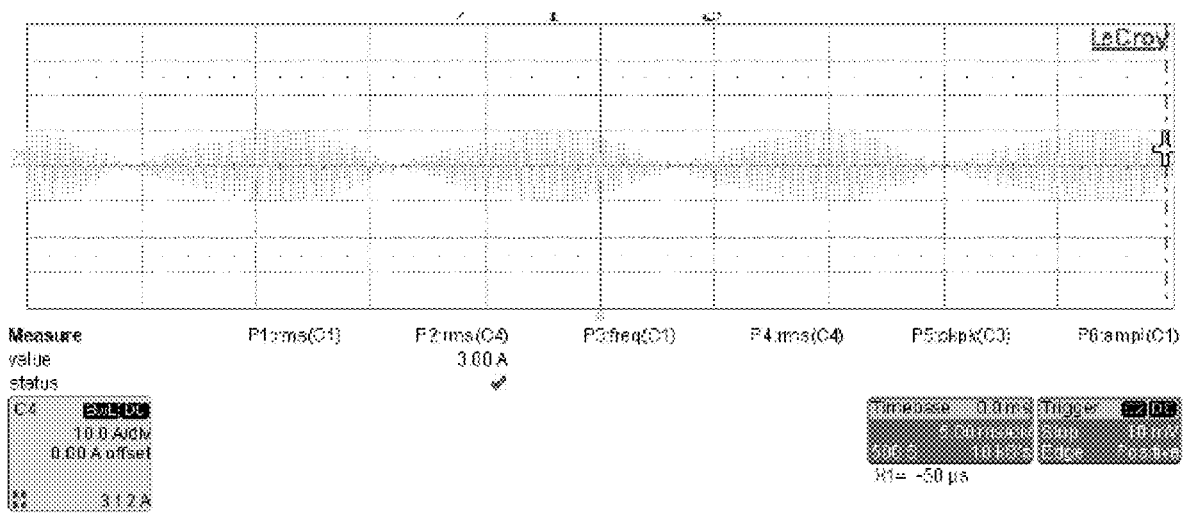
FIG. 9B shows a plot of output current without a controller and when a receiver is in motion.

FIGS. 9A and 9B display the output voltage (FIG. 9A) and input current (FIG. 9B) of DWC as the receiver travels over transmitter coils in the absence of the controller. It is evident that the amplitude of voltage and current varies due to coupling variations. At certain points, the amplitude of both voltage and current reduces to almost zero.

Figure 10:
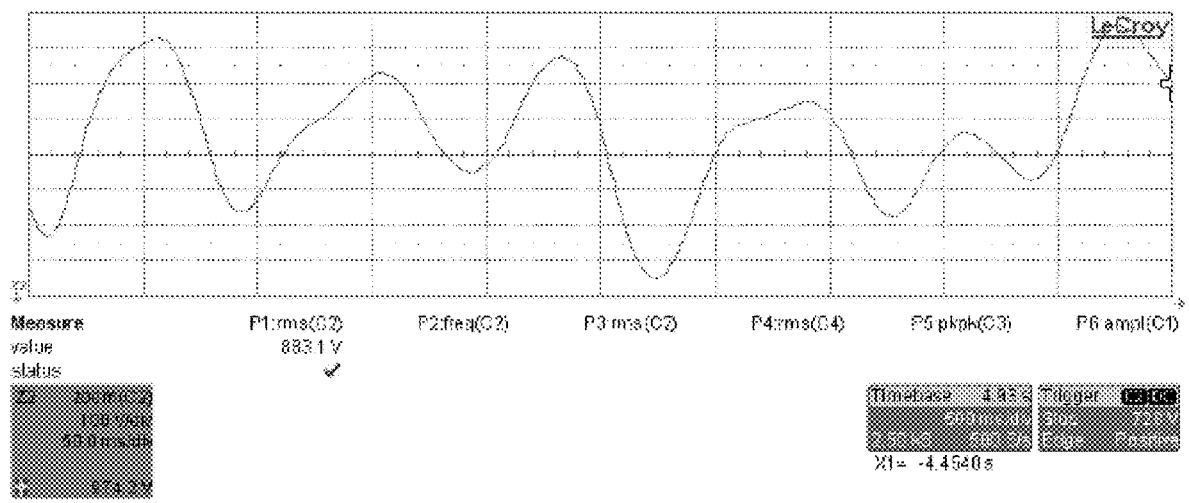
FIG. 10 shows a plot of input voltage of a buck converter while a receiver is in motion.

In FIG. 10, the input voltage of the buck converter ($V_{Cb1}$) is depicted, showcasing significant fluctuations attributed to the receiver pad's movement. To address this inherent variability, the controller of FIG. 3A orchestrates precise modulation of the MOSFET within the buck converter. This modulation is intelligently guided by continuous monitoring of both output power measurements and a predefined reference value. The result is a seamlessly stabilized output voltage and power at the buck converter's output, regardless of the fluctuation in the input voltage induced by vehicle motion.

Figure 11:
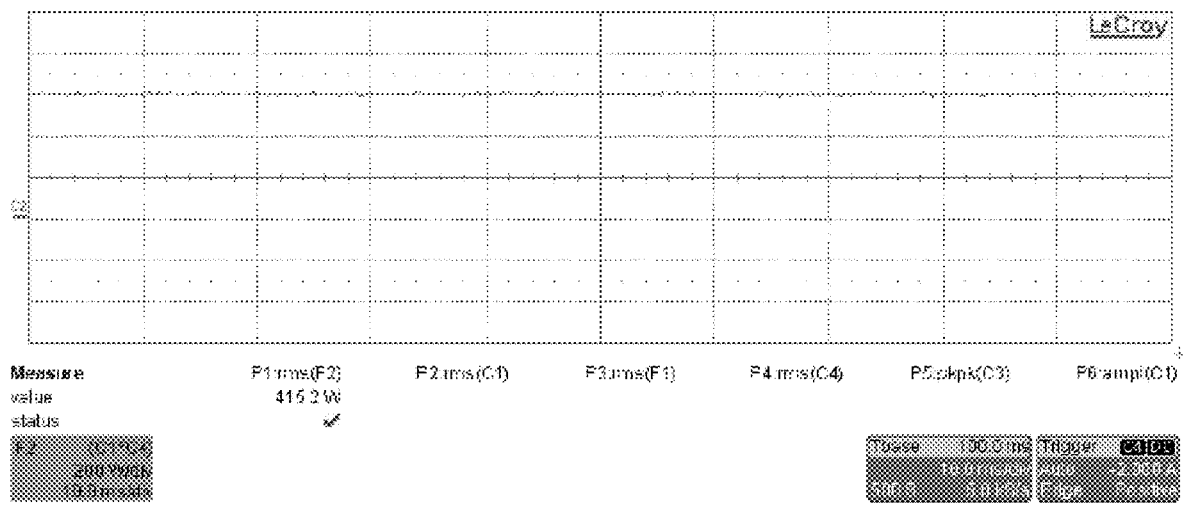
FIG. 11 shows a plot of an experimental result of output power when a receiver is traveling at a speed of 50 km/h.

FIG. 11 shows the output power of DWC system when the receiver pad is traveling at a speed of 50 km/h over the transmitter coils. As is evident, the output power remains stable and smooth, consistent with the simulation results.

Figure 12:
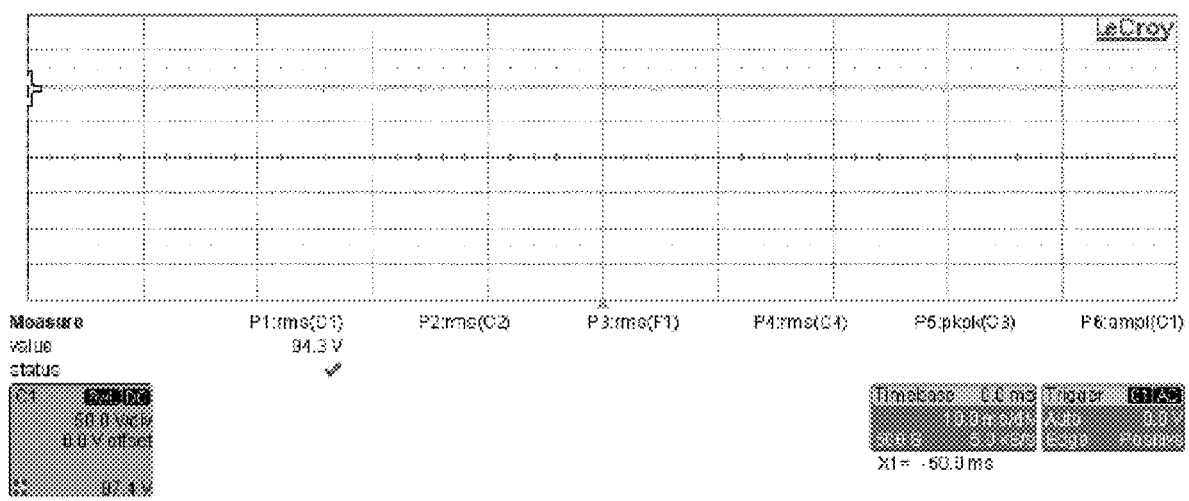
FIG. 12 shows a plot of output voltage of a DWC system power during receiver motion.

FIG. 12 illustrates the output voltage of the DWC system during receiver motion. The graph plainly indicates that the output voltage remains smooth and stable, irrespective of variations in mutual coupling.

Figure 13:
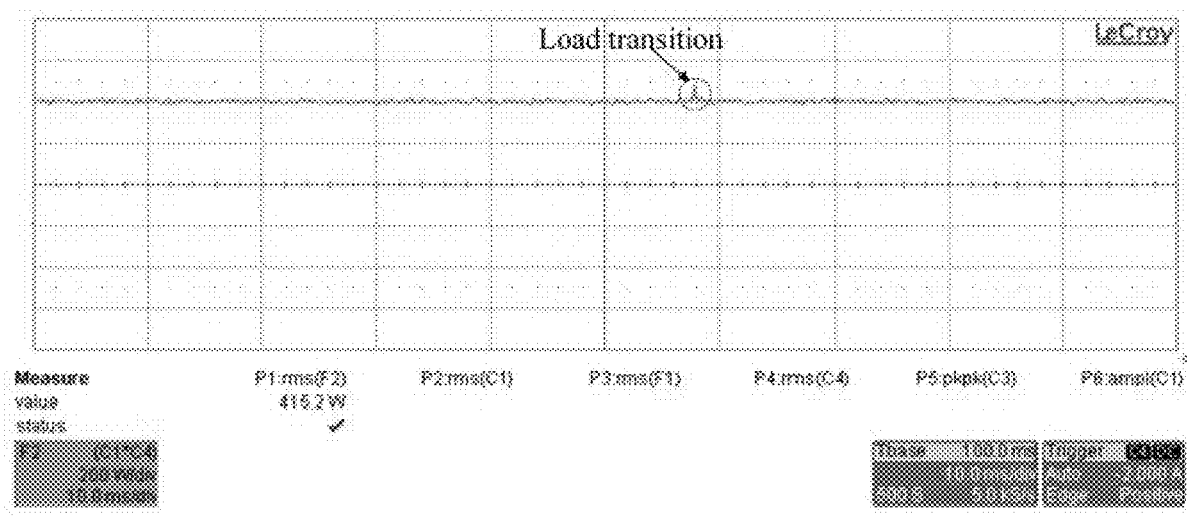
FIG. 13 shows a plot of output power of a DWC system power during receiver motion, with a load transition from 22 Ohms (Ω) to 26Ω.

FIG. 13 illustrates the output power of the DWC system during the motion of the receiver, with a load transition from 22Ω to 26Ω. The output power remains consistently at 415 W under both load conditions, with a slight transient increase observed during the load transition for a brief period. This underscores the effectiveness of the controller of FIG. 3A in maintaining stable and smooth power delivery, even in dynamic conditions when the receiver is in motion and load changes occur.

Figure 14:
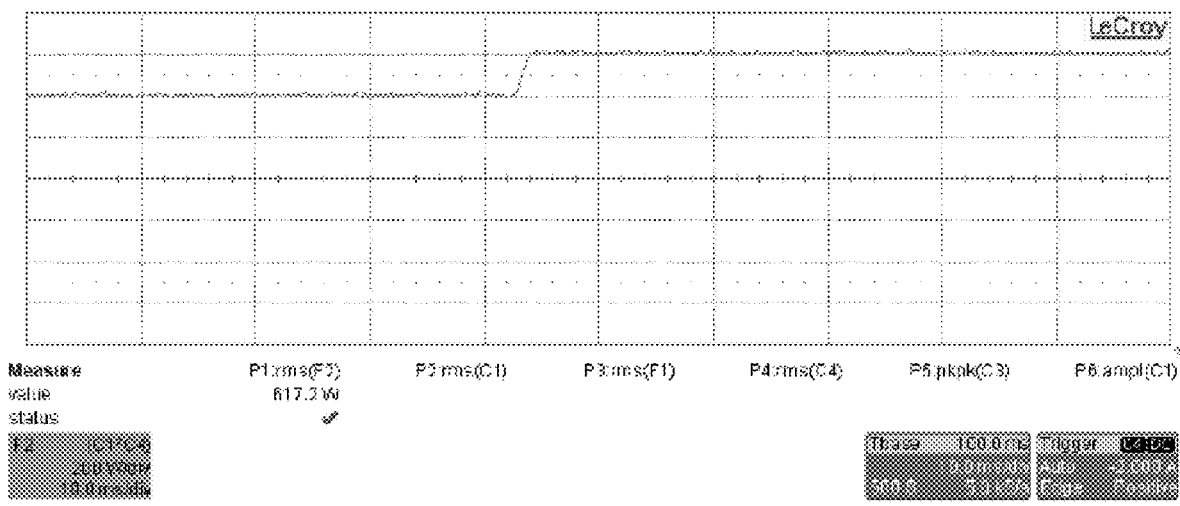
FIG. 14 shows a plot of output power of a DWC system power during receiver motion, when a reference value changes from 417 W to 615 W.

FIG. 14 shows the output power profile when the reference value is changing from 415 W to 617 W while the receiver is traversing over transmitter coils. The output power transition is fast and smooth, without overshoot or damping characteristics. Moreover, the fluctuation is very small at both reference values, indicating the robustness of the controller of FIG. 3A over changing reference values.

Figure 15:
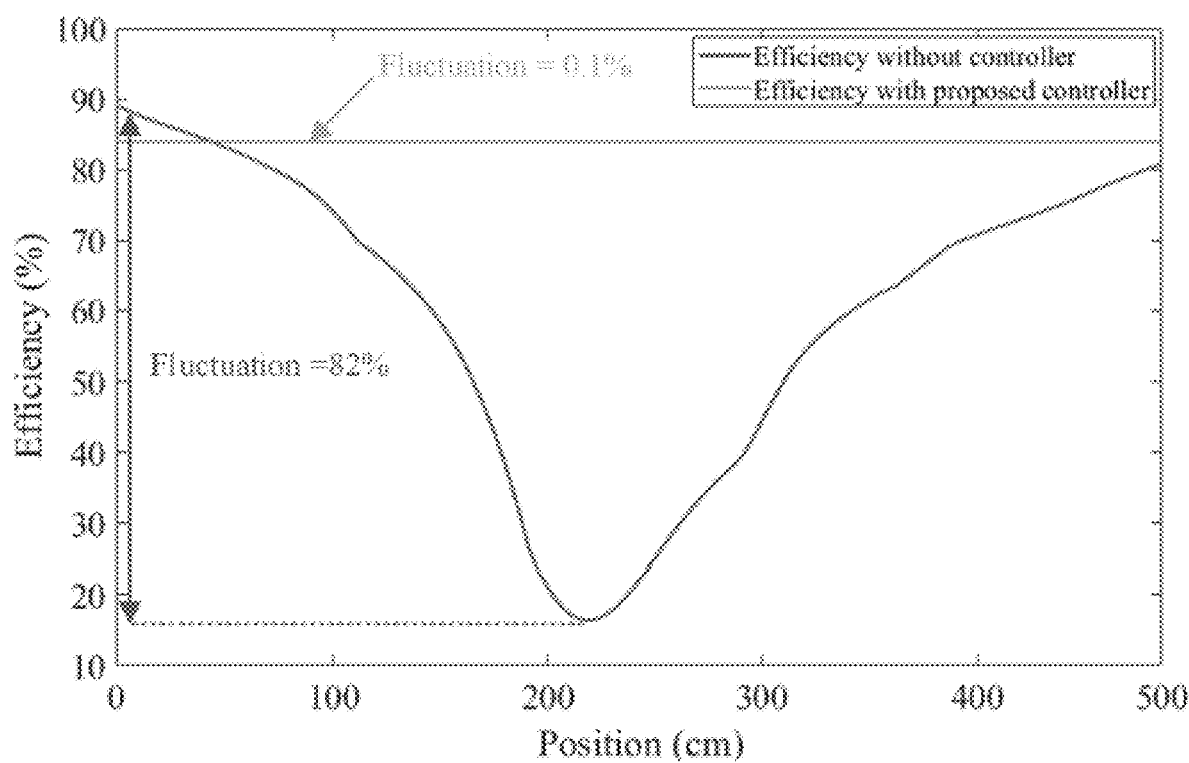
FIG. 15 shows a plot of efficiency (in percentage (%)) versus position (in centimeters (cm)), showing system efficiency in response to mutual inductance fluctuations caused by longitudinal misalignment. The curve labeled with "Fluctuation=82%" is for efficiency without a controller; and the curve labeled "Fluctuation=0.1%" is for efficiency with a controller according to an embodiment of the subject invention.

FIG. 15 presents the measured system efficiency in response to mutual inductance fluctuations arising from longitudinal misalignments. In the open-loop state, the system efficiency decreases, showing a fluctuation rate of 82%. Conversely, employing the controller of FIG. 3A sustains efficiency at about 84%, notably reducing the fluctuation rate to 0.1% during movement.

The table in FIG. 18 compares the controller of FIG. 3A with various secondary side control approaches designed to mitigate output fluctuations in DWC systems for electric vehicles. The results showcase the effectiveness of the controller of FIG. 3A compared to related art controls, emphasizing its superior dynamic tracking. The composite SOSM +backstepping control (FIG. 3A) demonstrates remarkable efficacy in mitigating output power fluctuations during electric vehicle movement, exhibiting stability at both low and high speeds. Moreover, its robustness is evident in maintaining stable power outputs even amidst load variations and coupling fluctuations, limiting the fluctuation rate to 1% or less (e.g., 0.1% or less).

The composite control method that combines second-order sliding mode control with back-stepping control addresses output power fluctuations in DWC systems for electric vehicles. The results from simulations and experiments confirm the efficacy of the controller in ensuring stable and consistent output power (e.g., at a speed of 50 km/h), with power fluctuations limited to 0.1% or less. Further, the controller exhibits rapid transient performance, minimizing output power pulsations during load variations and mutual coupling fluctuations, thereby maintaining a fluctuation rate of 0.1% or less across diverse load conditions. Moreover, the controller consistently maintains an efficiency of at least 80% (e.g., 84% or about 84%) across various positions as the vehicle travels over the transmitter coils.

Example 4

To validate the efficiency of the controller of FIG. 3C in maintaining a stable output voltage at the designated level amidst varying coupling coefficients, simulations were conducted using MATLAB-Simulink. The voltage reference for the simulation was set at 200 V. The simulation parameters employed are outlined in the table in FIG. 28.

Figure 23:
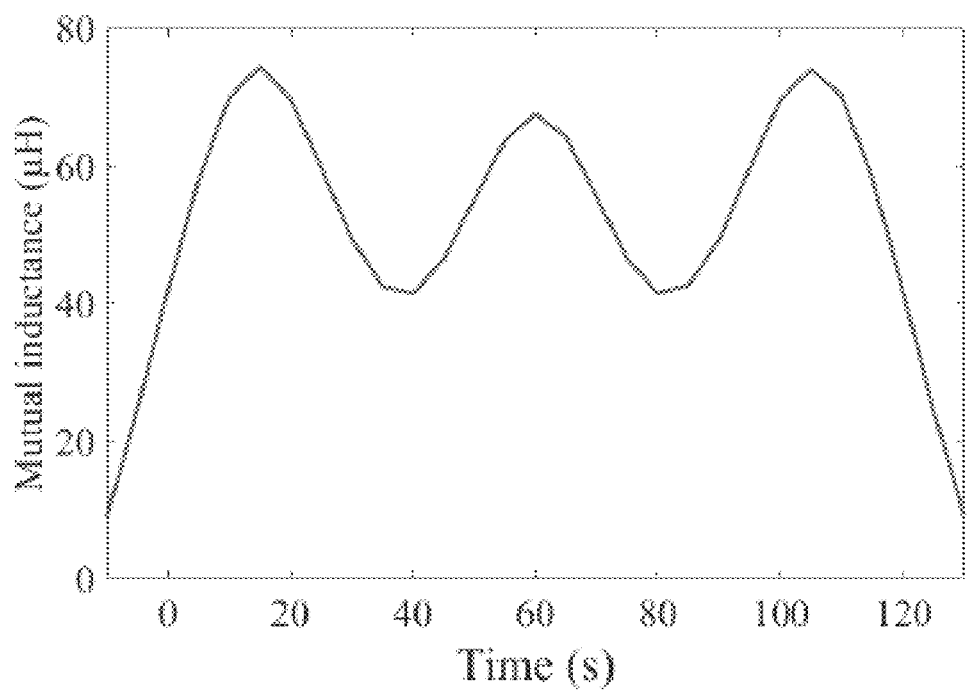
FIG. 23 shows a plot of mutual inductance (in µH) versus time (in sec), showing mutual inductance between a transmitter and a receiver.

FIG. 23 depicts the mutual inductance between the transmitter and receiver coils as the receiver traverses over the transmitter coils. When the receiver achieves full alignment with each coil, the mutual inductance reaches its peak. However, as the receiver moves into the space between adjacent transmitter coils, the mutual inductance decreases until it reaches its minimum at the midpoint between them.

Figure 24:
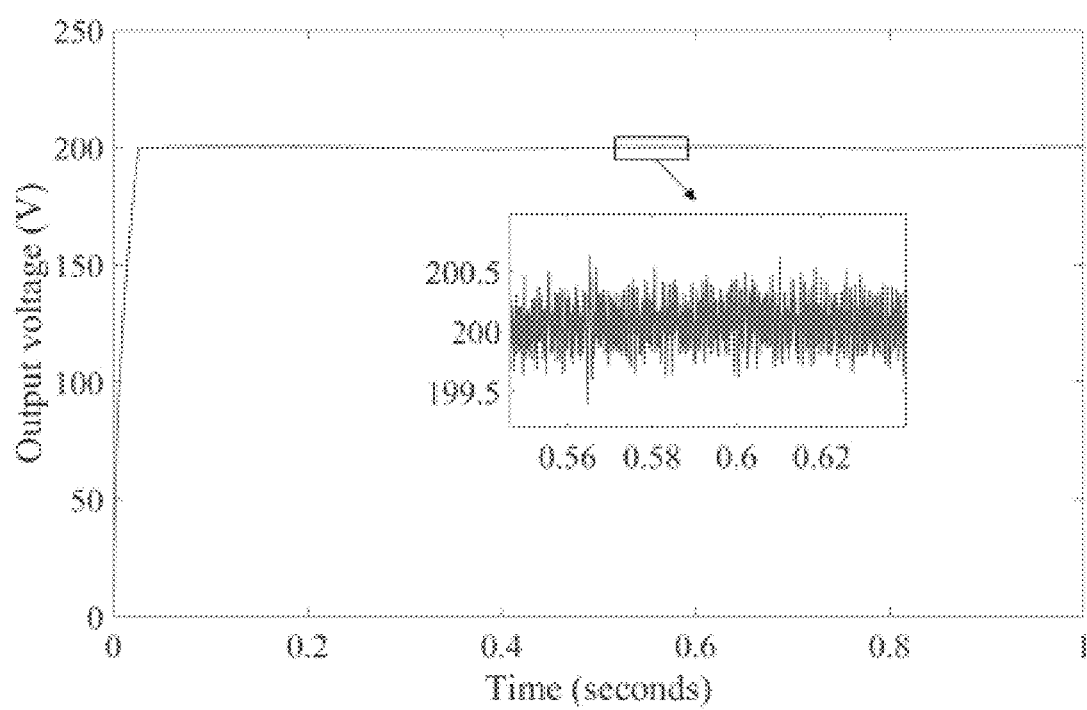
FIG. 24 shows a plot of output voltage (in V) versus time (in sec), showing output voltage of a DWC system, with a controller according to an embodiment of the subject invention, while a receiver is in motion.

FIG. 24 shows the output voltage of the DWC system under the operation of the controller of FIG. 3C as the receiver travels across transmitter coils. Referring to FIG. 24, the controller of FIG. 3C provides stable and smooth output voltage, limiting the fluctuation rate to within 0.25%. Moreover, the transient response of the controller of FIG. 3C is very fast and without overshoot in reaching the output voltage to the reference value.

Figure 25:
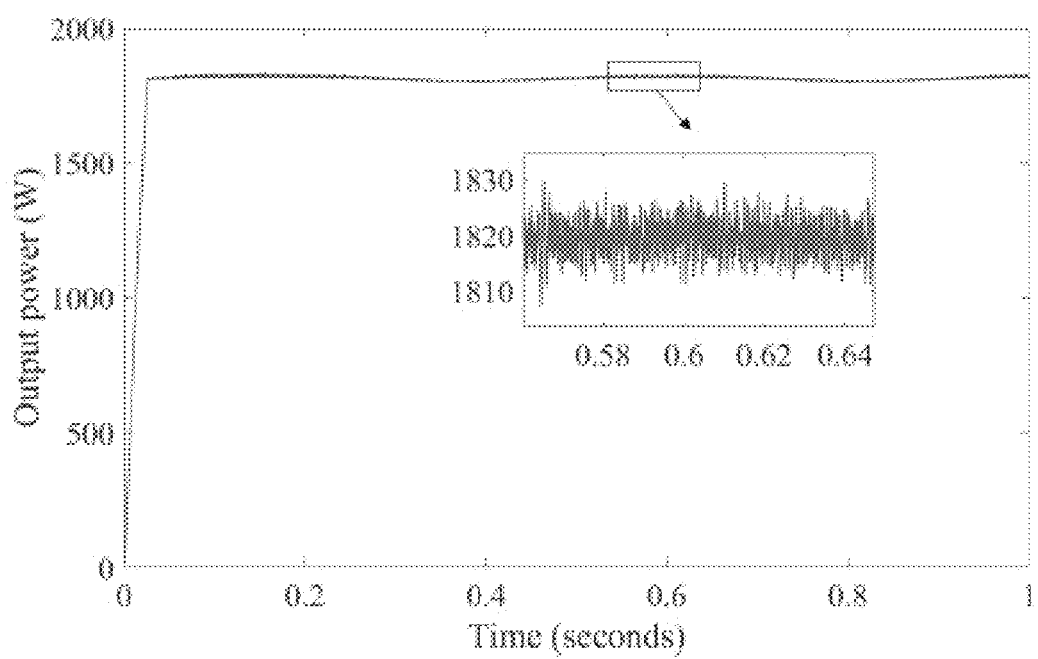
FIG. 25 shows a plot of output power (in W) versus time (in sec), showing output power of a DWC system, with a controller according to an embodiment of the subject invention, while a receiver is traversing transmitter coils.

FIG. 25 shows the output power of the DWC system when the controller of FIG. 3C is deployed and the receiver is traversing the transmitter coils. It is evident that the output power is stable, with a minimum ripple limited to 0.55%. Additionally, the power reaches stability in a finite time, showcasing the fast convergence characteristic of the controller.

Figure 26A:
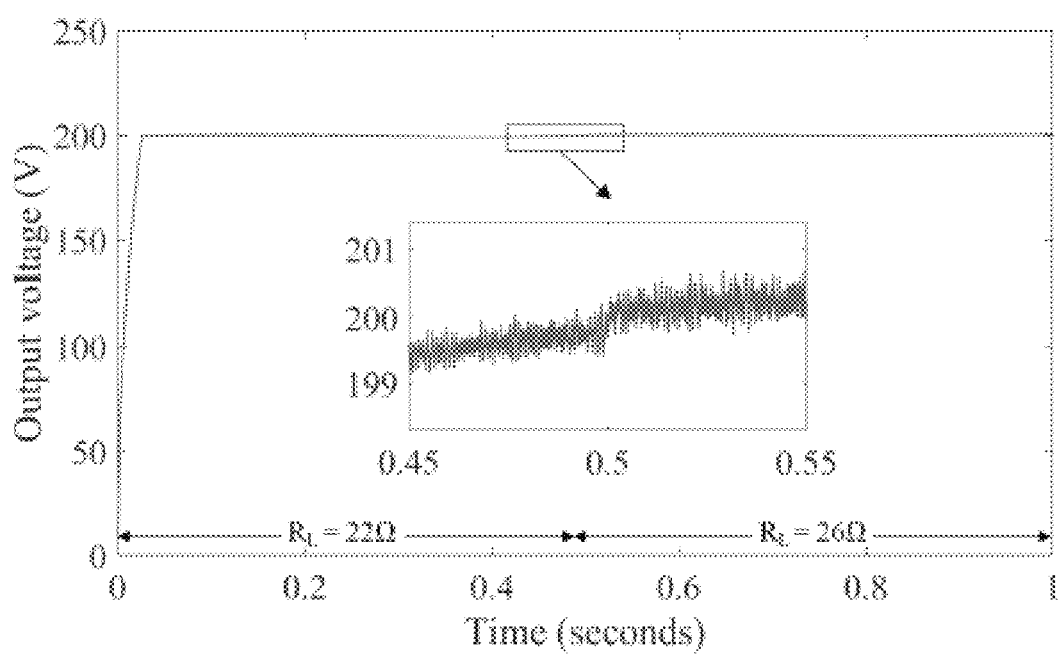
FIG. 26A shows a plot of output voltage (in V) versus time (in sec), showing output voltage of a DWC system when a load changes from 22Ω to 26Ω while a receiver is traveling.
Figure 26B:
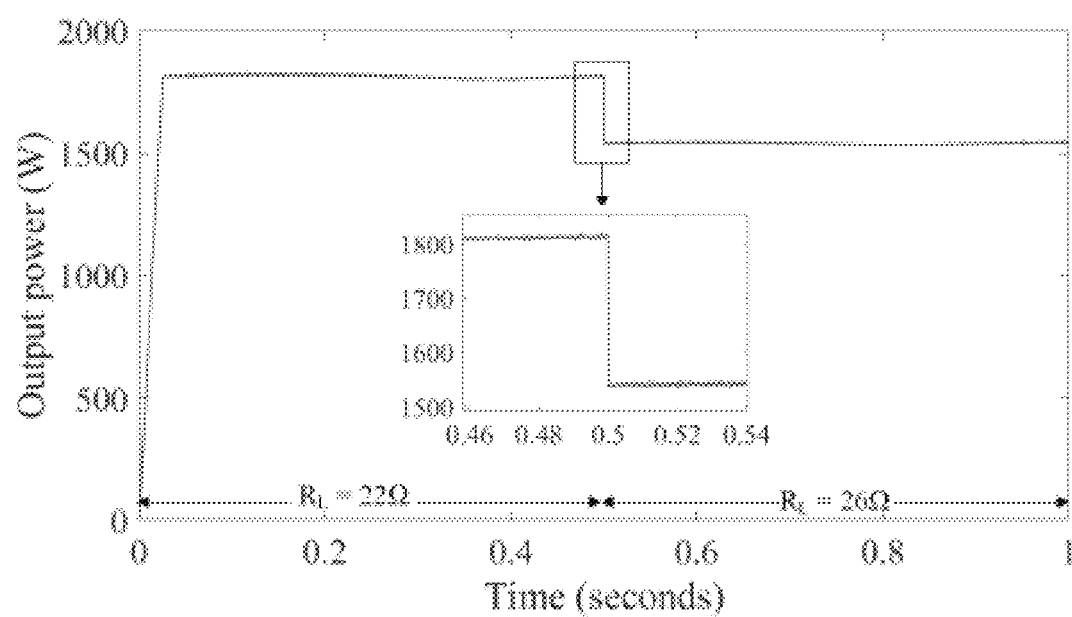
FIG. 26B shows a plot of output power (in W) versus time (in sec), showing output power of a DWC system when a load changes from 22Ω to 26Ω while a receiver is traveling.

FIGS. 26A and 26B show the results of the output voltage (FIG. 26A) and output power (FIG. 26B) when the load changes from 22Ω to 26Ω at 0.5 seconds while the receiver is in motion. Referring to FIG. 26A, the output voltage remains independent of the load change. At the moment of the load change (i.e., at 0.5 seconds), there is no alteration in the output voltage profile, showcasing the robustness of the controller of FIG. 3C in response to load changes, which do not affect the output voltage. It is worth mentioning that the fluctuation rate of the output voltage remains the same under both load conditions, limited to 0.25%.

Because the load change affects the output current, the output power consequently changes. FIG. 26B shows that the output power's response to the load change is smooth, fast, and without overshoot. Moreover, the output power ripple remains unchanged despite the load change, maintaining the fluctuation rate at 0.55%. These results demonstrate the superior transient response of the controller of FIG. 3C to changing loads while the mutual coupling varies.

Figure 27:
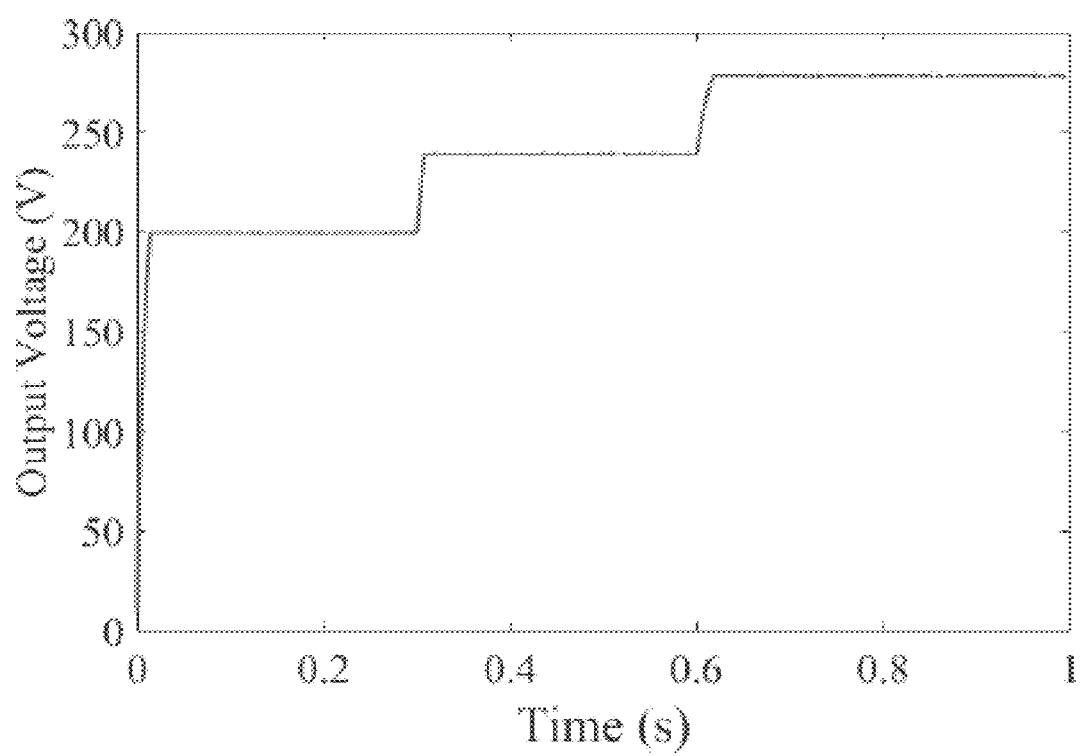
FIG. 27 shows a plot of output voltage (in V) versus time (in sec), showing output voltage of a DWC system when a reference changes from 200 V to 240 V at 0.3 sec and then from 240 V to 280 V at 0.6 sec while a receiver is traversing transmitter coils.

FIG. 27 shows the output voltage profile with the reference changing from 200 V to 240 V at 0.3 seconds and then from 240 V to 280 V at 0.6 seconds while the receiver is traveling. The very fast response of the system dynamics to changes in the output voltage reference due to deploying the controller of FIG. 3C can be noticed from FIG. 27. Despite the changes in the reference values, the output voltage fluctuations remain unchanged, showing the robustness of the controller.

A nonlinear control scheme based on the Lyapunov function minimized output voltage fluctuation and power pulsation for dynamic wireless charging of electric vehicles, subject to variations in mutual coupling due to vehicle motion. The controller provides stable and smooth output power and voltage despite mutual coupling variations. Moreover, the controller ensures that the output voltage remains independent of load conditions, meaning that changing load conditions do not impact the voltage. Additionally, the controller demonstrates superior transient performance and faster convergence. The results validate the effectiveness of the controller in suppressing fluctuations in output voltage and power, limiting the output voltage and power fluctuation rates to 0.25% and 0.55%, respectively. The controller eliminates the need for a detection system, rendering it both cost-effective and suitable for dynamic wireless charging applications.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for stabilizing voltage in dynamic wireless charging (DWC), the system comprising:
    a receiver coil configured to perform DWC with at least one transmitter coil;
    a direct current (DC)-DC converter at a receiver side and in operable communication with the receiver coil; and
    a controller in operable communication with the DC-DC converter,
    the controller being configured to perform the following steps during DWC:
    i) receive, from the receiver side during DWC, an output voltage of the DC-DC converter;
    ii) perform a backstepping control to compute a reference inductor current of the DC-DC converter based on an error of the output voltage of the DC-DC converter; and
    iii) perform a passivity-based control to drive an inductor current of the DC-DC converter to the reference inductor current computed by the backstepping control, thereby stabilizing an output voltage of a DWC apparatus performing the DWC,
    the performing of the passivity-based control comprising employing a dual-phase approach to reduce energy oscillations in inductors and capacitors of the receiver coil.

2. The system according to claim 1, the DC-DC converter being a DC-DC buck converter.

3. The system according to claim 1, steps ii) and iii) comprising using a Lyapunov function to regulate the output voltage of the DWC apparatus.

4. The system according to claim 1, the dual-phase approach comprising use of damping gains.

5. The system according to claim 1, the system having an efficiency of at least 80% as the receiver coil moves with respect to the at least one transmitter coil.

6. The system according to claim 1, the system being configured such that the output voltage has a fluctuation of less than 2% as the receiver coil moves with respect to the at least one transmitter coil.

7. The system according to claim 1, further comprising an electric vehicle having the receiving coil disposed thereon.

8. The system according to claim 1, the receiver coil being a bipolar coil.

9. The system according to claim 1, the system including no detection mechanism in operable communication with the receiver coil, the DC-DC converter the at least one transmitter coil, or the controller.

10. A method for stabilizing voltage in dynamic wireless charging (DWC), the method comprising:
    i) receiving, from a receiver side during DWC, an output voltage of a direct current (DC)-DC converter;
    ii) performing a backstepping control to compute a reference inductor current of the DC-DC converter based on an error of the output voltage of the DC-DC converter; and
    iii) performing a passivity-based control to drive an inductor current of the DC-DC converter to the reference inductor current computed by the backstepping control, thereby stabilizing an output voltage of a DWC apparatus performing the DWC,
    the performing of the passivity-based control comprising employing a dual-phase approach to reduce energy oscillations in inductors and capacitors of the receiver coil.

11. The method according to claim 10, the DC-DC converter being a DC-DC buck converter.

12. The method according to claim 10, steps ii) and iii) comprising using a Lyapunov function to regulate the output voltage of the DWC apparatus.

13. The method according to claim 10, the dual-phase approach comprising use of damping gains.

14. The method according to claim 10, the method having an efficiency of at least 80% as the receiver coil moves with respect to the at least one transmitter coil.

15. The method according to claim 10, the output voltage having a fluctuation of less than 2% as the receiver coil moves with respect to the at least one transmitter coil.

16. The method according to claim 10, the receiver coil being disposed on an electric vehicle.

17. The method according to claim 10, the receiver coil being a bipolar coil.

18. A system for stabilizing voltage in dynamic wireless charging (DWC), the system comprising:
    a receiver coil configured to perform DWC with at least one transmitter coil;
    an electric vehicle having the receiving coil disposed thereon;
    a direct current (DC)-DC converter at a receiver side and in operable communication with the receiver coil; and
    a controller in operable communication with the DC-DC converter,
    the controller being configured to perform the following steps during DWC:
    i) receive, from the receiver coil during DWC, an output voltage of the DC-DC converter;
    ii) perform a backstepping control to compute a reference inductor current of the DC-DC converter based on an error of the output voltage of the DC-DC converter; and
    iii) perform a passivity-based control to drive an inductor current of the DC-DC converter to the reference inductor current computed by the backstepping control, thereby stabilizing an output voltage of a DWC apparatus performing the DWC, the DC-DC converter being a DC-DC buck converter, steps ii) and iii) comprising using a Lyapunov function to regulate the output voltage of the DWC apparatus, the performing of the passivity-based control comprising employing a dual-phase approach to reduce energy oscillations in inductors and capacitors of the receiver coil, the dual-phase approach comprising use of damping gain, the system having an efficiency of at least 80% as the receiver coil moves with respect to the at least one transmitter coil, the system being configured such that the output voltage has a fluctuation of less than 2% as the receiver coil moves with respect to the at least one transmitter coil, the receiver coil being a bipolar coil, and the system including no detection mechanism in operable communication with the receiver coil, the DC-DC converter, the at least one transmitter coil, or the controller.

* * * * *